United States Patent [19]

Kizaki et al.

[11] Patent Number: 5,126,868
[45] Date of Patent: Jun. 30, 1992

[54] COLOR COMPENSATED DOUBLE LAYERED LIQUID CRYSTAL DISPLAY DEVICE

[75] Inventors: Seiichi Kizaki, Hachioji; Toshiomi Ono, Machida; Ken Kozima, Kunitachi; Mikiya Itakura, Hino; Toshihiro Aoki, Oome, all of Japan

[73] Assignee: Casio Computer Co., Ltd., Tokyo, Japan

[21] Appl. No.: 455,946

[22] Filed: Dec. 22, 1989

[30] Foreign Application Priority Data

Dec. 27, 1988 [JP] Japan ............................ 63-168920[U]

[51] Int. Cl.$^5$ ................................................ G02F 1/13
[52] U.S. Cl. ....................................... 359/86; 359/53; 359/63; 359/73
[58] Field of Search ............... 350/331 T, 335, 347 E, 350/349, 341, 337; 340/784

[56] References Cited

U.S. PATENT DOCUMENTS

| | | | |
|---|---|---|---|
| 4,436,379 | 3/1984 | Funada et al. | 350/335 |
| 4,443,065 | 4/1984 | Funada et al. | 350/347 E |
| 4,508,427 | 4/1985 | Ross | 350/335 |
| 4,842,379 | 6/1989 | Oishi et al. | 350/335 |
| 4,904,058 | 2/1990 | Kato et al. | 350/335 |
| 4,941,737 | 7/1990 | Kimura | 350/335 |
| 4,952,029 | 8/1990 | Hayashi et al. | 350/347 E |

FOREIGN PATENT DOCUMENTS

| | | | |
|---|---|---|---|
| 57-96315 | 6/1982 | Japan | 350/335 |
| 57-125919 | 8/1982 | Japan | 350/335 |
| 62-506 | 1/1987 | Japan | 350/335 |
| 62-16412 | 4/1987 | Japan | 350/335 |
| 63-53528 | 10/1988 | Japan | 350/335 |
| 63-53529 | 10/1988 | Japan | 350/335 |
| 1-35420 | 2/1989 | Japan . | |
| 1-39084 | 8/1989 | Japan | 350/335 |
| WO89/03542 | 4/1989 | World Int. Prop. O. . | |

OTHER PUBLICATIONS

S.I.D. International Symposium, Digest of Technical Papers, May 1988, vol. XIX, pp. 49-52, 487, SID; N. Kimura et al., "Multicolor Display by Double-Layered Supertwisted-Nematic LCD", Sections 105, 8; FIGS. 1,3.

Japanese Journal of Applied Physics/Part 2, Letters, vol. 26, No. 11, Nov. 1987, pp. L1784-L1786, Tokyo, JP; Katoh et al., "Application of Retardation Compensation; A New Highly Multi-Plexiable Black-White Liquid Crystal Display with Two Super-Twisted Nematic Layers".

*Primary Examiner*—Rolf Hille
*Assistant Examiner*—Minh Loan Tran
*Attorney, Agent, or Firm*—Frishauf, Holtz, Goodman & Woodward

[57] ABSTRACT

A display cell is mounted on a color-compensating cell. The display cell has a pair of substrates each having an alignment-treated surface, a first liquid-crystal layer and electrodes. Multiplex drive signals are supplied to the electrodes. The color-compensating cell has a second liquid-crystal layer. The molecules of the first liquid-crystal layer are twisted by a twist angle ranging from 160° to 270°. The molecules of the second liquid-crystal layer are twisted by the same angle in the opposite direction. The substrates are alignment-treated in two directions, respectively, which are substantially at right angles to each other. One of the polarizing plates has an optical axis crossing at 35° to 50° with an aligning direction of the liquid crystal molecules on that substrate adjacent to the polarizing plate, and crossing with the optical axis of the other polarizing plate at right angles. The second liquid-crystal cell compensates for the coloring of the light passing through the display cell. The second liquid-crystal layer has retardation $\Delta n_2 \cdot d_2$, which is less than the retardation $\Delta n_1 \cdot d_1$ of said first liquid-crystal layer, for compensating for a decrease in the retardation $\Delta n_1 \cdot d_1$, which has resulted from the excitation of the liquid-crystal molecules by application of a bias voltage to unselected pixels of the display cell.

18 Claims, 11 Drawing Sheets

COLOR COMPENSATED DOUBLE LAYERED LIQUID CRYSTAL DISPLAY DEVICE

BACKGROUND OF THE INVENTION

1. Field of the Invention

The present invention relates to a liquid crystal display device which is constituted by a two-layered STN (super twisted nematic) liquid crystal device to compensate the colored display obtained by a single STN-LCD to have a black and white display.

2. Description of the Related Art

Recently, a dot matrix liquid crystal display device for displaying a television image or the like tends to have a significantly large number of display pixels to ensure a larger active area and higher resolution. Accordingly, the liquid crystal display device is demanded to be multiplex-driven at high duty.

When a TN type liquid crystal display device which has been widely used is multiplex-driven, its operation margin decreases and the display contrast decreases, thus impairing the view angle characteristic. In this respect, the TN type liquid crystal display device is not suitable for multiplex-driving.

To improve the multiplex-drive characteristic, STN type liquid crystal display devices (STN-LCD) have been developed which have liquid crystal molecules twisted at a greater twist angle (e.g., 180° to 270°) than that of the ordinary TN type liquid crystal display device.

This STN-LCD is of a double refraction effect type which has its polarizing plate arranged in such a way that the direction of the axis of polarization (transmitting axis or absorption axis) forms an angle of 35° to 50° to the direction of orientation of the liquid crystal molecules adjacent to that surface of the substrate on the side of the polarizing plate. A linear polarized light coming through a polarizing plate on the light incident side becomes an elliptically polarized light due to the double refraction effect (birefringence) of the liquid crystal layer. That part of the elliptically polarized light which passes through the polarizing plate on the light-leaving side causes an image to be displayed. This STN-LCD utilizes the double refraction effect of the liquid crystal layer, which has a different refractive-index anisotropy for each wavelength. This property of the liquid crystal layer increases the transmittance of light in a specific wavelength range to thereby provide a colored display.

To eliminate such coloring of the display screen caused by the STN-LCD, a two-layered STN-LCD has been proposed in which a color-compensating liquid crystal cell is provided on the light incident side or light-leaving side to eliminate the coloring effect.

This two-layered STN-LCD comprises a display liquid crystal cell, a color-compensating liquid crystal cell and a pair of polarizing plates. The display liquid crystal cell has a display electrode and has liquid crystal molecules twisted at an angle of 180° to 270°. The color-compensating liquid crystal cell comprises a layer of liquid crystal molecules twisted at the same angle as those of the display liquid crystal cell but in the opposite direction, and a STN type liquid crystal cell oriented in such a way that the orientation directions of its liquid crystal molecules adjacent to the adjoining substrate surfaces of the display liquid crystal cell and the color-compensating liquid crystal cell are normal to each other. The polarizing plate pair are disposed in such a way that they sandwich these layered two cells and that the direction of the transmitting axis of one of the polarizing plates crosses at an angle of 35° to 50° to the orientation direction of the liquid crystal molecules on the substrate surface of the liquid crystal cell adjacent to this polarizing plate on the side thereof, and the direction of the transmitting axis of the other polarizing plate is substantially normal to that of the transmitting axis of the former polarizing plate.

This arrangement permits the phase difference or retardation between the ordinary light and extraordinary light for each wavelength of light passing one of the liquid crystal cells to be canceled out by the other liquid crystal cell due to dispersion of rotatory polarization of the liquid crystal layers of both liquid crystal cells. Therefore, coloring of the display screen can be substantially eliminated.

In order to cancel out the retardation between the ordinary light and extraordinary light for each wavelength of light passing one liquid crystal cell, the phase difference between the ordinary light and extraordinary light for each wavelength of light passing the other liquid crystal cell should be made coincident with that of the former liquid crystal cell. If both liquid crystal cells are produced in the same process, the elements for changing the retardation such as the thickness of a liquid crystal layer (cell gap) becomes stable so that the produced liquid crystal cells can have uniform retardation. Because of these reasons, conventionally both liquid crystal cells are made of the same liquid crystal material, are subjected to the same aligning treatment and are given with the same cell gap.

When this two-layered STN-LCD is multiplex-driven, however, unselected elements and half-selected elements of a plurality of pixels appear to be colored. That is, the aligning area of the pixels appears as a colored background so that a B/W display cannot be provided.

Further, since the double refraction of the liquid crystal material significantly changes by temperature, the amount of compensation varies with a change in temperature of the liquid crystal display, thus changing the color of the display screen.

Furthermore, due to the temperature-dependency of the liquid crystal material, the value of the optical anisotropy $\Delta n$ of the liquid crystal at a high temperature side becomes smaller, and $\Delta n \cdot d$ also becomes smaller, thus reducing the transmittance. In addition, since the viscosity of the liquid crystal becomes high at a low temperature side, the response is significantly reduced.

SUMMARY OF THE INVENTION

Accordingly, it is an object of this invention to provide a STN-LCD which can provide a black and white display over a wide range of temperature.

It is another object of this invention to provide a two-layered STN-LCD which prevents coloring of a non-lit portion when multiplex-driven, and has a less change in tone of the color of the display screen with a change in temperature while having a high contrast and high response.

To achieve the above objects, the liquid crystal display device of the present invention comprises:

first, second and third substrates opposing to one another;

a first set of electrodes formed on a surface of the first substrate which opposes the second substrate;

a second set of electrodes formed on a surface of the second substrate which opposes the first substrate, and located in face-to-face relationship with at least one of the electrodes of the first set;

a first aligning film formed on at least one part of the first substrate and also on the electrode of the first set, and surface-treated such that liquid-crystal molecules existing near the first aligning film have a predetermined pre-tilt angle and are aligned in a first direction;

a second aligning film formed on at least one part of the second substrate and also on the electrode of the second set, and surface-treated such that liquid-cyrstal molecules existing near the second aligning film have a predetermined pre-tilt angle and are aligned in a second direction;

first nematic liquid crystal interposed between the first substrate and the second substrate and having a desired retardation $\Delta n_1 \cdot d_1$, where $\Delta n_1$ is the refractive-index anisotropy of the first nematic liquid crystal and $d_1$ is the thickness of the layer of the liquid crystal, the molecules of the first nematic liquid crystal being twisted, from the first direction to the second direction, by a first twist angle of 160° to 270° in a first rotation direction;

a third aligning film located between the second substrate and the third substrate, and surface-treated such that liquid-crystal molecules existing near the third aligning film have a predetermined pre-tilt angle and are aligned in a third direction which is substantially at right angles to the second direction;

a fourth aligning film formed on at least one part of that surface of the third substrate which opposes the second substrate, and surface-treated such that liquid-cyrstal molecules existing near the fourth aligned film have a predetermined pre-tilt angle and are aligned in a fourth direction deviating from the the third direction by an angle equal to the first twist angle;

second nematic liquid crystal interposed between the second substrate and the third substrate and having a desired retardation $\Delta n_2 \cdot d_2$, where $\Delta n_2$ is the refractive-index anisotropy of the second nematic liquid crystal and $d_2$ is the thickness of the layer of the liquid crystal, which is less than the retardation $\Delta n_1 \cdot d_1$ of the first nematic liquid crystal, the molecules of the second nematic liquid crystal being twisted, from the third direction to the fourth direction, by a second twist angle equal to the first twist angle in a second rotation direction, which is opposite to the first rotation direction; and a pair of polarizing plates located outside the first substrate and the third substrate, respectively, the first polarizing plate having a polarizing axis crossing a direction in which the liquid crystal molecules are aligned on the substrate adjacent to the first polarizing plate, at an angle ranging from 35° to 50°, and the second polarizing plate having an optical axis crossing the optical axis of the first polarizing plate substantially at right angles.

According to the present two-layered STN-LCD, $\Delta n \cdot d$, a product of the thickness d of the liquid crystal layer and the refractive-index anisotropy $\Delta n$ of the liquid crystal material for the color-compensating cell, is set smaller than that of the display cell. These values of $\Delta n \cdot d$ are set substantially equal to a value corresponding to a product of a change in refractive-index anisotropy $\Delta n$ of the liquid crystal layer caused when the liquid crystal molecules rise by the bias voltage applied to non-lit elements of the display cell and the thickness d of the liquid crystal layer. As a result, the retardation of the ordinal light and extraordinal light at the non-lit elements when the display cell is multiplex-driven nearly equals the retardation for the color-compensating cell. This can ensure color compensation of non-lit elements and can provide a black display screen.

If $\Delta n \cdot d$ is made smaller by increasing the pre-tilt angle of the color-compensating cell, the display cell and color-compensating cell can be made of the same liquid crystal material and their substrate gaps can be made equal to each other, thus facilitating their production. If $\Delta n \cdot d$ of the color-compensating cell is made smaller by reducing the refractive-index anisotropy $\Delta n$ of the liquid crystal material used for the color-compensating cell and increasing the thickness of the liquid crystal layer, the substrate gap of the color-compensating cell can be increased. This reduces a variation in the substrate gap and thus facilitates the cell production.

Further, the color-compensating cell of the present invention is made of a liquid crystal material having a small temperature-dependency of $\Delta n$ than that of the display cell. Accordingly, color compensation can surely be effected even with respect to a change in temperature of both cells and a black and white display screen with a less change in color can be provided. Furthermore, the color-compensating cell is made of such a liquid crystal material that $\Delta n$ is slightly smaller than the refractive-index anisotropy $\Delta n$ of the liquid crystal material for the display cell at a high temperature and the difference between $\Delta n$ of the liquid crystal material of the color-compensating cell and that of the display cell at a low temperature is sufficiently greater than the value obtained at a high temperature. In this case, the difference of the optical anisotropy $\Delta n$ between both cells at a high temperature is small, so that the transmittance is high, and these cells can respond at a high speed at a low temperature while color compensation can surely be effected. Therefore, the present two-layered STN-LCD can have a stable display characteristic over a wide temperature range and can thus be properly used in a wide temperature range.

DETAILED DESCRIPTION OF THE PREFERRED EMBODIMENTS

The present invention presents a liquid crystal display device in which $\Delta n \cdot d$ of the color-compensating cell is made smaller than $\Delta n \cdot d$ of the display cell to compensate for the color of the display screen when the device is multiplex-driven and/or a liquid crystal material whose temperature-dependency of $\Delta n \cdot d$ differs from that of the liquid crystal material for the display cell, thus ensuring color compensation for a wide range of temperature and a good electrooptical characteristic.

Specific embodiments will now be described in detail.

First Embodiment

The first embodiment will be described below referring to FIG. 1.

Figure 1:
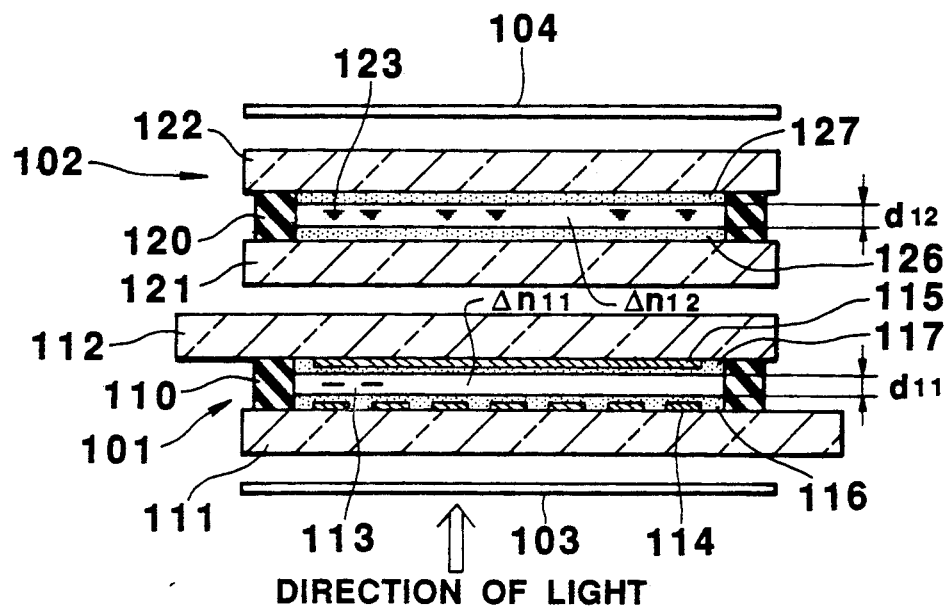
FIG. 1 is a cross-sectional view illustrating the schematic structure of a liquid crystal display device according to the first embodiment of the present invention.

FIG. 1 is a cross-sectional view of the present two-layered STN-LCD and illustrates the structure in which a color-compensating liquid crystal cell is disposed on a light-leaving side of a display liquid crystal cell.

This two-layered STN-LCD comprises two layered STN liquid crystal cells 101 and 102 and polarizing plates 103 and 104 disposed on both sides of the cell layer, respectively. Of the two STN liquid crystal cells, the lower cell 101 (on the light incident side) serves to display an image, while the upper cell 102 (on the light leaving side) serves to compensate color. Hereinafter, the display liquid crystal cell 101 is called a display cell while the color-compensating liquid crystal cell 102 is called a color-compensating cell.

The display cell 101 is constituted by sealing a liquid crystal 113 between a pair of transparent substrates 111 and 112 adhered through a frame-shaped seal member 110. A plurality of display transparent electrodes 114 and 115 (e.g., scanning electrodes and signal electrodes for a liquid crystal cell of a simple matrix type) are formed on the opposing surfaces of both substrates 111 and 112. Those portions of the transparent electrodes facing each other form a plurality of pixels. Aligning films 116 and 117 are formed on at least those transparent electrodes.

The color-compensating cell 102 is constituted by sealing a liquid crystal 123 between a pair of transparent substrates 121 and 122 adhered through a frameshaped seal member 120. Aligning films 126 and 127 are formed, but no display electrodes, on the opposing surfaces of both substrates 121 and 122. The aligning films 116, 117, 126 and 127 each comprise a homogeneous aligning film of polyimide or the like which has its surface rubbed.

The liquid crystal 123 of the color-compensating cell 102 has a layer thickness $d_{12}$ and a refractive-index anisotropy $\Delta n_{12}$ such that their product, $\Delta n_{12} \cdot d_{12}$, is smaller than $\Delta n_{11} \cdot d_{11}$ which is a product of the layer thickness $d_{11}$ and refractive-index anisotropy $\Delta n_{11}$ of the liquid crystal 113 of the display cell 101. The difference between $\Delta n_{11} \cdot d_{11}$ and $\Delta n_{12} \cdot d_{12}$ corresponds to a change in $\Delta n_b \cdot d_{11}$ of the liquid crystal caused at the time the molecules of the liquid crystal 113 slightly rise by the bias voltage applied to unselected elements when a multiplex drive signal is applied between the transparent electrodes 114 and 115 of the display cell 101. This difference between $\Delta n_{11} \cdot d_{11}$ and $\Delta n_{12} \cdot d_{12}$ can be given by making the layer thickness $d_{12}$ of the liquid crystal 123 of the color-compensating cell 102 smaller than $d_{11}$ of the liquid crystal 113 of the display cell 101 or making $\Delta n_{12}$ of the liquid crystal 123 of the color-compensating cell 102 smaller than $\Delta n_{11}$ of the liquid crystal 113 of the display cell 101.

Figure 2:
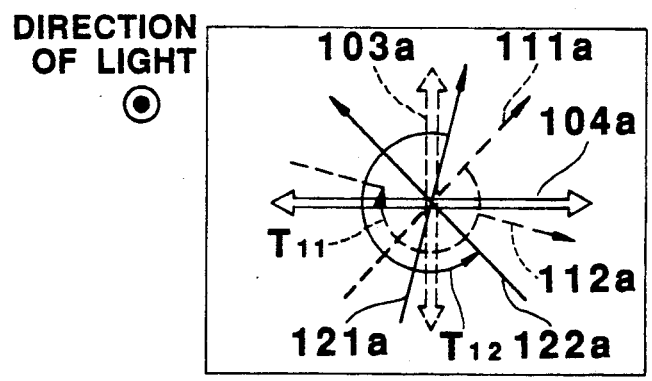
FIG. 2 is a plan view illustrating the direction of aligning treatment of substrates and the directions of the polarization axes of polarizing plates in the display device shown in FIG. 1.

FIG. 2 illustrates the orientation directions of the liquid crystal molecules of the display cell 101 and the color-compensating cell 102 and the directions of the polarization axes of the polarizing plates 103 and 104. Referring to FIG. 2, reference symbols "111a" and "112a" indicate the aligning directions of the lower and upper substrates 111 and 112 of the display cell 101, and "$T_{11}$" indicates the twisted direction of the liquid crystal molecule alignment. The liquid crystal 113 of the display cell 101 is a nematic liquid crystal having a levorotatory optical active member (chiral liquid crystal or the like) mixed therein to have counterclockwise rotatory polarization. The molecules of this liquid crystal 113 are twisted by 240° between both substrates 111 and 112 counterclockwise as viewed from the traveling direction of the transmitting light (as viewed from the lower substrate 111) toward the aligning direction 112a of the upper substrate 112 from the aligning direction 111a of the lower substrate 111. In FIG. 2, reference symbols "121a" and "122a" indicate the aligning directions of the lower and upper substrates 121 and 122 of the color-compensating cell 102, and "$T_{12}$" indicates the twisted direction of the liquid crystal molecule alignment. The aligning direction 121a of the lower substrate 121 of the color-compensating cell 102 is substantially normal to the aligning direction 112a of the upper substrate 112 of the display cell 101. The liquid crystal 123 of the color-compensating cell 102 is a nematic liquid crystal having a dextrorotatory optical active member (chiral liquid crystal or the like) mixed therein to have clockwise rotatory polarization. The molecules of this liquid crystal 123 are twisted by the same angle (240°) as the twist angle of the liquid crystal molecule alignment of the display cell 101 between both substrates 121 and 122 clockwise as viewed from the traveling direction of the transmitting light toward the aligning direction 122a of the upper substrate 122 from the aligning direction 121a of the lower substrate 121.

Reference symbols "103a" and "104a" indicates the directions of the polarization axes of the polarizing plate pair 103 and 104. The direction of the polarization axis 104a of the upper polarizing plate 104 is shifted by 35° to 50° clockwise as viewed from the traveling direction of transmitting light with respect to the aligning direction 122a of the upper substrate 122 of the color-compensating cell 102 close to the upper polarizing plate 104. The direction of the polarization axis 103a of the lower polarizing plate 103 is nearly normal to the direction 104a of the polarization axis of the upper polarizing plate 104.

According to the two-layered STN-LCD, the liquid crystal molecules of the display cell 101 and those of the color-compensating cell 102 are twisted by the same angle in the opposite directions, and the aligning directions 112a and 121a of the adjoining substrates of the display cell 101 and color-compensating cell 102 (the upper substrate 112 of the display cell 101 and the lower substrate 121 of the color-compensating cell 102) are substantially normal to each other. Therefore, the ordinal light component and extraordinal light component which have passed the display cell 101 respectively become the extraordinal light component and ordinal light component of the color-compensating cell 102 and propagate through this cell 102. Accordingly, the phase difference or retardation between the ordinal light component and extraordinal light component of light for each wavelength which has passes the display cell 101 can be canceled out by the color-compensating cell 102. Therefore, light passing through the two-layered liquid crystal cell can come out as a linear polarized light to thereby compensate the coloring of the display screen.

When a drive signal for executing a multiplex driving is applied between the transparent electrodes 114 and 115 of the display cell 101, a bias voltage is applied to non-lit elements such as unselected elements and half-selected elements and the liquid crystal molecules are aligned in slightly rising state. This reduces $\Delta n_{11} \cdot d_{11}$ of the liquid crystal layer of the display cell 101.

According to the present two-layered STN-LCD, $\Delta n_{12} \cdot d_{12}$ of the color-compensating cell 102 is set smaller than $\Delta n_1 \cdot d_1$ in the initial orientation state of the display cell 101, and it is set equal to $\Delta n_b \cdot d_1$ given when the bias voltage is applied to the liquid crystal layer of the display cell 101. Therefore, the light passing through non-lit elements can surely be subjected to color compensation, thus eliminating leaking light and providing a black display and a high contrast.

Second Embodiment

In the second embodiment, $\Delta n \cdot d$ of the color-compensating cell is set smaller than $\Delta n \cdot d$ of the display cell by making the pre-tilt angle of the liquid crystal molecules of the color-compensating cell greater than that of the liquid crystal molecules of the display cell. This embodiment will now be described in detail referring to FIGS. 3 to 5.

Figure 3:
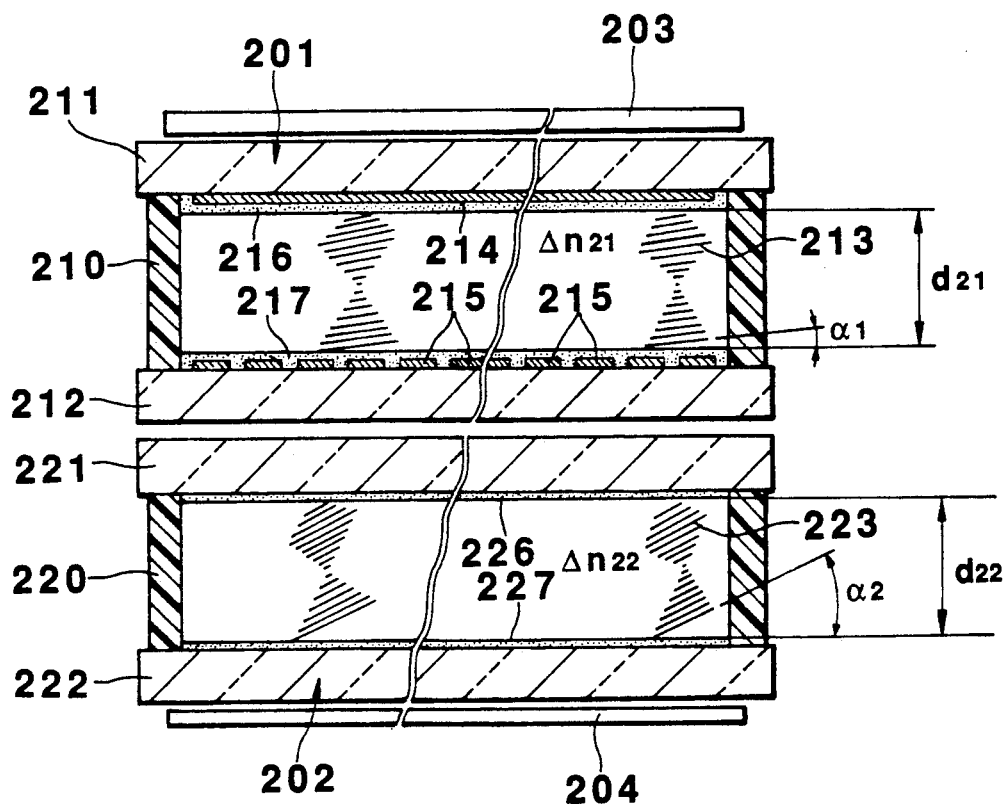
FIG. 3 is a cross-sectional view illustrating the schematic structure of a liquid crystal display device according to the second embodiment of the present invention.

FIG. 3 is a cross-sectional view of the present two-layered STN-LCD. Like the first embodiment, this liquid crystal display device comprises two layered STN liquid crystal cells 201 and 202 and polarizing plates 203 and 204 disposed on both sides of the cell layer, respectively. Of the two STN liquid crystal cells, the upper cell 201 serves to display an image, while the lower cell 202 serves to compensate color.

The display cell 201 is constituted by sealing a liquid crystal 213 between a pair of transparent substrates 211 and 212 adhered through a seal member 210. Many stripe-shaped transparent scanning electrodes 214 are formed on one of the opposing surfaces of both substrates 211 and 212, for example, on the inner surface of the upper substrate 211. Many stripe-shaped transparent signal electrodes 215 normal to the scanning electrodes 214 are formed on the surface of the lower substrate 212. Homogeneous aligning films 216 and 217 of polyimide or the like are respectively formed on the electrode-forming surfaces of the substrates 211 and 212. These aligning films 216 and 217 have undergone aligning treatment such as rubbing. The liquid crystal 213 sealed between the substrates 211 and 212 is a nematic liquid crystal having levorotatory optical active material (chiral liquid crystal or the like) mixed therein to have a counterclockwise rotatory polarization. The molecules of this liquid crystal 213 have the aligning direction restricted by the aligning films 216 and 217 and are twisted between the substrates 211 and 212.

Figure 4A:
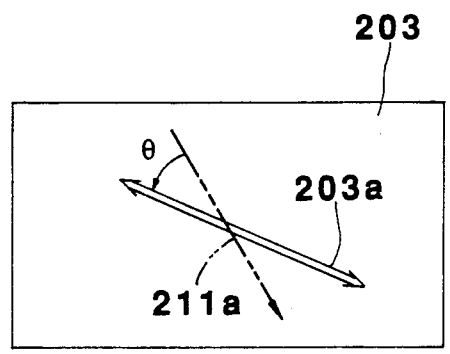
FIG. 4A is a plan view illustrating the direction of the polarization axis of an upper polarizing plate in the display device shown in FIG. 3.
Figure 4B:
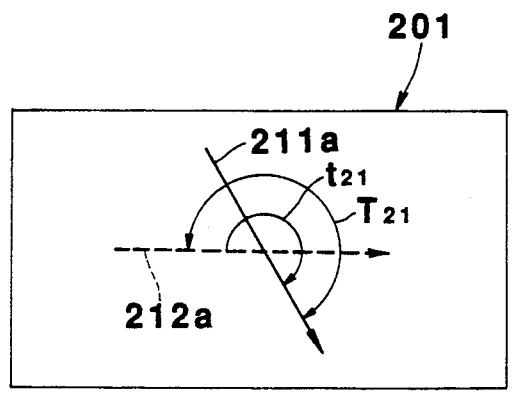
FIG. 4B is a plan view illustrating the direction of the aligning treatment done on the inner surface of the substrate of a display cell shown in FIG. 3.

FIG. 4B illustrates the orientation directions of the liquid crystal molecules of the display cell 201 on the surfaces of both substrates 211 and 212. Referring to FIG. 4B, reference symbols "211a" and "212a" indicate the aligning directions of the liquid crystal molecules on the upper and lower substrates 211 and 212, respectively, reference symbol "$T_{21}$" indicates the twist angle of the liquid crystal molecule alignment, and reference symbol "$t_{21}$" indicates the twisted direction of the liquid crystal molecule alignment. The liquid crystal molecules are twisted by a twist angle $T_{21}$ of 240° counterclockwise (as viewed from the lower substrate 111) toward the aligning direction 211a of the upper substrate 211 from the aligning direction 212a of the lower substrate 212.

The pre-tilt angle $\alpha_1$ of the liquid crystal molecules to the surfaces of the substrates 211 and 212 of the display cell 201 is 5° to 20°, the cell gap (thickness of the liquid crystal layer) $d_{21}$ is 4 μm to 7 μm, the ratio (d/P) of the cell gap $d_{21}$ and the thickness P (pitch) of the liquid crystal layer necessary to twist by 360° only by the rotatory polarization of the liquid crystal (liquid crystal having an optical active material added) itself is 0.5 to 0.75, the refractive-index anisotropy $\Delta n_{21}$ of the liquid crystal 213 is 0.11 to 0.22, and $\Delta n_{21} \cdot n_{21}$ (product of the refractive-index anisotropy $\Delta n_{21}$ and the cell gap $d_{21}$ when the pre-tilt angle of the liquid crystal molecules is 0°) is 0.82.

The color-compensating cell 202 is constituted by sealing a liquid crystal 223 between a pair of transparent substrates 221 and 222 adhered through a seal member 220. Only horizontal aligning films 226 and 227 are formed, but no display electrodes, on the opposing surfaces of both substrates 221 and 222. The aligning films 226 and 227 have undergone aligning treatment such as rubbing. The liquid crystal 223 sealed between the substrates 221 and 222 is the same nematic liquid crystal as the liquid crystal 213 of the display cell 201, which however has dextrorotatory optical active material mixed therein to have a clockwise rotatory polarization. The molecules of the liquid crystal 223 are twisted in the opposite direction to the twisted direction of those of the display cell 201.

Figure 4C:
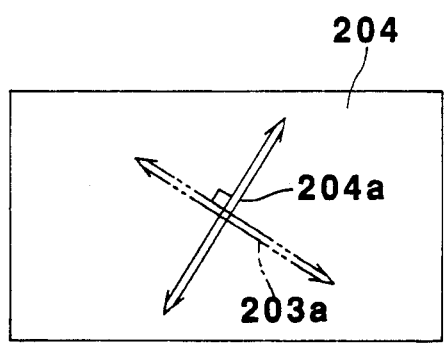
FIG. 4C is a plan view illustrating the direction of the polarization axis of a lower polarizing plate in the display device shown in FIG. 3.
Figure 4D:
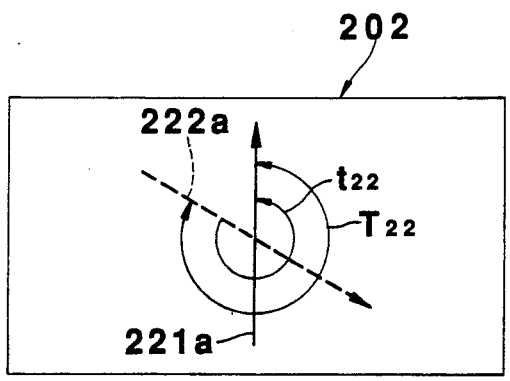
FIG. 4D is a plan view illustrating the direction of the aligning treatment done on the inner surface of the substrate of a color-compensating cell shown in FIG. 3.

FIG. 4D illustrates the orientation directions of the liquid crystal molecules of the color-compensating cell 202 on the surfaces of both substrates 221 and 222. Referring to FIG. 4D, reference symbols "221a" and "222a" indicate the aligning directions of the liquid crystal molecules on the upper and lower substrates 221 and 222, respectively, reference symbol "$T_{22}$" indicates the twist angle of the liquid crystal molecule alignment, and reference symbol "$t_{22}$" indicates the twisted direction of the liquid crystal molecule alignment. The liquid crystal molecules are twisted by the same twist angle $T_{22}$ ($T_{22}=240°$) as that $T_{21}$ of the liquid crystal molecules of the display cell 201 clockwise (as viewed from the lower substrate 222) toward the aligning direction 221a of the upper substrate 221 from the aligning direction 222a of the lower substrate 222.

The pre-tilt angle $\alpha_2$ of the liquid crystal molecules for color compensation is 10° to 30°, and it is set greater about 5° to 10° than the pre-tilt angle $\alpha_1$ of the liquid crystal molecules of the display cell 201.

The cell gap (thickness of the liquid crystal layer) $d_{22}$ of the color-compensating cell 202 is 4 μm to 7 μm, the ratio d/P is 0.5 to 0.75, $\Delta n_{22}$ is 0.11 to 0.22, and $\Delta n_{22}\cdot d_{22}$ is 0.82. These values are the same as those of the display cell 201.

Those cells 201 and 202 are disposed in such a way that the aligning directions of their liquid crystal molecules on the adjoining substrates (the lower substrate 212 of the display cell 201 and the upper substrate 221 of the color-compensating cell 202) are substantially normal to each other.

Referring to FIG. 3, reference numeral "203" denotes an upper polarizing plate placed on the the display cell 201, and reference numeral "204" denotes a lower polarizing plate placed under the color-compensating cell 202. FIGS. 4A and 4C illustrate the directions of the transmitting axes of the polarizing plates 203 and 204. As shown in FIG. 4A, the direction 203a of the transmitting axis of the upper polarizing plate 203 is shifted by an angle of 35° to 50°) clockwise (as viewed from the side of the lower substrate 212 of the display cell 201) with respect to the aligning direction 211a of the liquid crystal molecules on the upper substrate 211 of the display cell 201. The direction 204a of the transmitting axis of the lower polarizing plate 204 is nearly normal to the direction 203a of the transmitting axis of the upper polarizing plate 203, as shown in FIG. 4C.

When this liquid crystal display device is multiplex-driven, a bias voltage is applied to the unselected elements and half-selected elements of the display cell 201. This bias voltage causes the liquid crystal molecules to slightly rise from the pre-tilt angle $\alpha_1$. The refractive-index anisotropy $\Delta n_b$ as viewed from the thickness direction of the liquid crystal layer in the above state is smaller than $\Delta n_{21}$ which the liquid crystal itself has. According to the liquid crystal display device of this embodiment, the pre-tilt angle $\alpha_2$ of the liquid crystal molecules of the color-compensating cell 202 is set greater than $\alpha_1$ of those of the display cell 201. Accordingly, $\Delta n_b\cdot d_{21}$ at the non-lit element portion (unselected and half-selected elements) applied with the bias voltage when the display cell 201 is multiplex-driven, becomes substantially equal to $\Delta n_{22}\cdot d_{22}$ associated with the pre-tilt angle $\alpha_2$ of the liquid crystal molecules of the color-compensating cell 202. It should be desirable that the pre-tilt angle $\alpha_2$ of the liquid crystal molecules of the color-compensating cell 202 be selected to be greater by 5° to 10° than $\alpha_1$ of those of the display cell 201 in accordance with the refractive-index anisotropy of the liquid crystal itself, the twist angle of the liquid crystal molecules, etc. Further, the pretilt angle $\alpha_2$ is set in such a way that the retardation of the unselected element portion, $\Delta n_b\cdot d_{21}$, substantially equals $\Delta n_{22}\cdot d_{22}$ of the color-compensating cell The retardation Re of the STN-LCD is expressed in terms of $\Delta n\cdot d$ of the liquid crystal itself and the pretilt angle $\alpha$ of the liquid crystal molecules as follows:

$$Re = \Delta n\cdot d \times \cos^2\alpha.$$

When the two-layered STN-LCD is multiplex-driven, the retardation Re of the color-compensating cell 202 to which no voltage is applied does not change. The retardation Re of the unselected element portion of the display cell 201 decreases as the liquid crystal molecules, when applied with a voltage, slightly rise and are driven. Since the pre-tilt angle $\alpha_2$ of the liquid crystal molecules of the color-compensating cell 202 is selected in the above-mentioned manner, however, the retardation Re of the unselected element portion of the display cell 201 in multiplex-driven mode can be set substantially equal to that of the color-compensating cell 202. The present light crystal display device can therefore prevent light leaking caused by the rising of the liquid crystal molecules of the non-lit element portion of the display cell 201. This can improve the characteristic of the black display to thereby provide a good display contrast.

If the twist angles $T_{21}$ and $T_{22}$ of the liquid crystal molecules of both cells 201 and 202 are set to 240° and $\Delta n\cdot d$ is set to 0.82, the display screen closest the black and white display can be attained.

Figure 5:
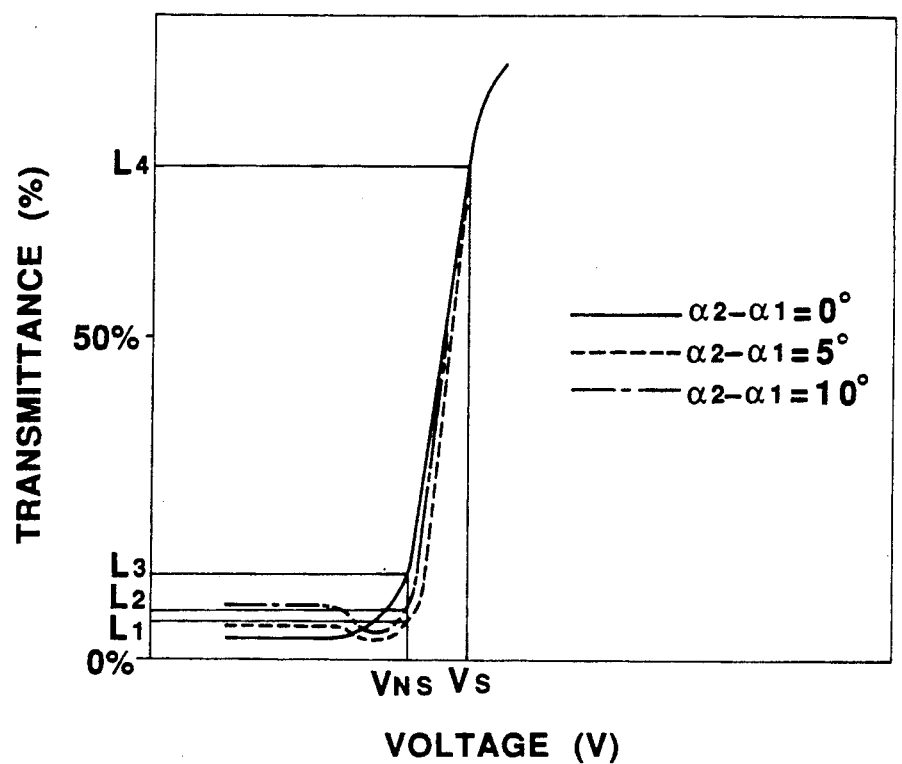
FIG. 5 is a graph showing an electrooptical characteristic of the liquid crystal display device according to the second embodiment shown in FIG. 3.

FIG. 5 illustrates the results of measuring the transmittance when the liquid crystal display device with $\alpha_2-\alpha_1=10°$ (difference between the pre-tilt angles of the liquid crystal molecules of both cells 202 and 201), the liquid crystal display device with $\alpha_2-\alpha_1=5°$ and the liquid crystal display device with $\alpha_2-\alpha_1=0°$ are multiplex-driven by 1/15 bias and at 1/200 duty. In this diagram, "$V_{NS}$ and $V_S$ are a unselected voltage and a selected voltage determined by the bias and duty. For instance, with 1/15 bias and 1/200 duty, the ratio of the selected voltage to the unselected voltage, $V_S/B_{NS} \approx 1.073$.

As is evident from this electrooptical characteristic diagram, the transmittance $L_4$ when the selected voltage $V_S$ is applied to the liquid crystal display devices with $\alpha_2$ set greater than $\alpha_1$ is the same as that of the last liquid crystal display device with $\alpha_2-\alpha_1=0°$. When the unselected voltage $V_{NS}$ is applied, however, the transmittance $L_1$ and $L_2$ for the former two liquid crystal display devices are smaller than the transmittance $L_3$ for the third liquid crystal display device. In other words, those liquid crystal display devices having $\alpha_2$ for the color-compensating cell 202 set greater than $\alpha_1$ for the display cell 201, have a higher contrast (=transmittance when $V_S$ is applied/transmittance when $V_{NS}$ is applied) than the liquid crystal display device with $\alpha_2-\alpha_1=0°$.

When the device is multiplex-driven at a duty of 200, the liquid crystal display device with $\alpha_2 - \alpha_1 = 5°$ has a higher contrast than the one having $\alpha_2 - \alpha_1 = 10°$, as shown in FIG. 5. When multiplex driving is done at a duty of 200, therefore, it is desirable that $\alpha_2$ be selected to be greater by about 5° than $\alpha_1$.

According to this embodiment, the display cell 201 and color-compensating cell 202 are separate cells However, the lower substrate 212 of the display cell 201 may also be used as the upper substrate 221 of the color-compensating cell 202. Alternately, when the display cell 201 and the color-compensating cell 202 are laminated, either cell may come on top the other.

Further, although in this embodiment, the twist angles $T_{21}$ and $T_{22}$ of the liquid crystal molecules of both cells 201 and 202 are set to 240°, they may take any value within a range of 200° to 270° (as long as $T_{21} = T_{22}$). The values of $\Delta n_{21} \cdot d_{21}$ and $\Delta n_{22} \cdot d_{22}$ need to be within a range of 0.70 to 0.90.

Furthermore, although the pre-tilt angle difference $(\alpha_2 - \alpha_1)$ is set between 5° to 10°, this difference may be set larger. (It should however noted that the upper limit of the pre-tilt angle difference which provided a higher contrast than the conventional liquid crystal display device is about 15°). It is therefore desirable that $\alpha_2 - \alpha_1 = 3°$ to 15°.

Third Embodiment

Figure 6:
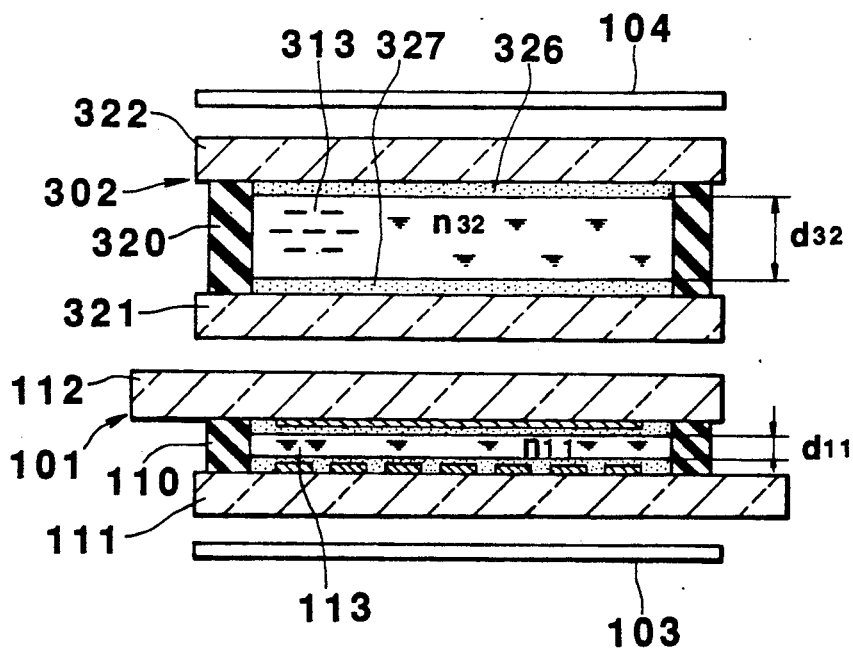
FIG. 6 is a cross-sectional view illustrating the schematic structure of a liquid crystal display device according to the third embodiment of the present invention.

According to the third embodiment, a liquid crystal material whose liquid crystal itself has a small refractive-index anisotropy $\Delta n$ is used for the color-compensating cell. The influence of a variation in thickness of the liquid crystal layer of the color-compensating cell on a change in the color of the display screen is made small to provide uniform black and white display as well as to reduce the production error of the liquid crystal layer thickness in the manufacturing process by setting $\Delta n \cdot d$, a product of the optical anisotropy and the thickness of this color-compensating cell, smaller and increasing the thickness of the liquid crystal layer. This can therefore facilitate the manufacturing process. The third embodiment will now be described in detail referring to FIG. 6.

Since the structures and locations of a display cell and a pair of polarizing plates according to the third embodiment are the same as those of the display cell 101 and polarizing plates 103 and 104 in the first embodiment, the same reference numerals will be given to the corresponding or identical members and their description will be omitted below. The color-compensating cell 302, like the color-compensating cell 102 (FIG. 1) of the first embodiment, is constituted by adhering an upper substrate 322 and a lower substrate 321 having homogeneous aligning films 326 and 327 formed thereon, through a seal member 320 and sealing a liquid crystal 23 between the substrates 322 and 321. Aligning films 116 and 117 are formed o the opposing surfaces of the substrates 111 and 112 of the display cell 101, and aligning films 326 and 327 on the opposing surfaces of the substrates 321 and 322 of the color-compensating cell 302. These aligning films are subjected to aligning treatment in the same direction as is shown in FIG. 2. The liquid crystal 113 of the display cell 101 and the liquid crystal 323 of the color-compensating cell 302 are twisted 240° in the opposite directions. The directions of the polarization axes of the polarizing plates 103 and 104 disposed to hold both liquid crystal cells 101 and 302 are the same as those of the first embodiment shown in FIG. 2.

According to the third embodiment, the liquid crystal 313 having a smaller refractive-index anisotropy $\Delta n_{32}$ than $\Delta n_{11}$ of the liquid crystal 113 of the display cell 101 is used for the color-compensating cell 302 while the the thickness of the liquid crystal $d_{32}$ is set greater than $d_{11}$ of the display cell 101. The refractive-index anisotropy and liquid crystal layer thickness are set to satisfy the following condition:

$$\Delta n_{32} \cdot d_{32} < \Delta n_{11} \cdot d_{11} < \Delta n_{32} \cdot d_{32} \times 1.10$$

In the two-layered STN-LCD according to the third embodiment, since the liquid crystal layer thickness $d_{32}$ of the color-compensating cell 302 is set larger, it is possible to reduce the influence of a variation in this thickness on $\Delta n_{32} \cdot d_{32}$.

In general, the thickness of the liquid crystal of the liquid crystal cell or the cell gap is set to a given level by disposing a cell gap forming member such as a glass fiber between both substrates. As the size (thickness) of the cell gap forming member has an allowable variation, the cell gap naturally varies according to the variation in the size of this member. In a two-layered STN-LCD, the variation in cell gap of the color-compensating cell varies $\Delta n_{32} \cdot d_{32}$ of color-compensating cell. This variation in $\Delta n_{32} \cdot d_{32}$ greatly influences the color of the display screen, and thus causes a large variation in white background when display elements are selected.

Figure 7:
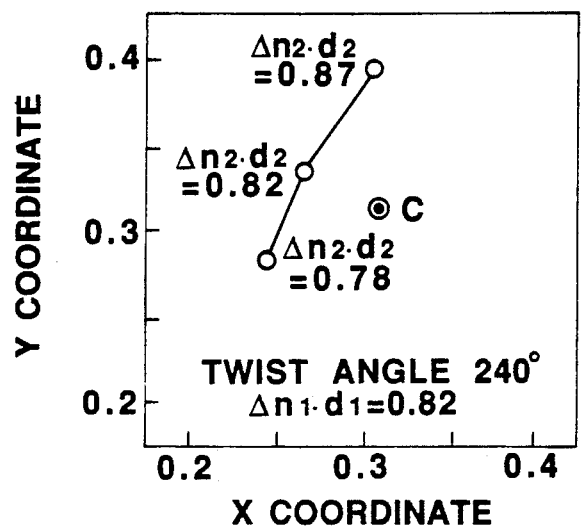
FIG. 7 is a CIE chromaticity diagram illustrating the dependency of the color of a display screen with respect to $\Delta n \cdot d$ of the color-compensating cell in a conventional two-layered STN-LCD.

FIG. 7 is a CIE chromaticity diagram illustrating how the color of white dots displayed on a screen changes with a change in $\Delta n \cdot d$ of the color-compensating cell in the conventional two-layered STN-LCD having the twist angles of liquid crystal molecule alignment of both display cell and color-compensating cell being set to 240°. If $\Delta n \cdot d$ of the display cell (product of the refractive-index anisotropy $\Delta n$ of the liquid crystal and the thickness d of the liquid crystal layer) is $\Delta n \cdot d = 0.82$ (constant), when $\Delta n \cdot d$ of the color-compensating cell is 0.82, the color of the white dots is close to the white point C (non-coloring point). When the $\Delta n \cdot d$ of the color-compensating cell increases to 0.87, the color of the white dots becomes yellowish, and when the value decreases to 0.78, the color of the white dots becomes bluish.

As the thickness $d_{32}$ of the liquid crystal layer of the color-compensating cell 302 is large in the two-layered STN-LCD of this embodiment, however, a ratio of a variation to $d_{32}$ is small. Accordingly, it is possible to reduce the change in $\Delta n_{32} \cdot d_{32}$ resulting from the variation in the thickness $d_{32}$ of the liquid crystal layer.

According to the two-layered STN-LCD of this embodiment, even if there is a variation in the color-compensating cell 302, a nearly uniform white display can be attained by reducing a variation in the color of the display screen in a state where display elements are selected.

Further, according to the two-layered STN-LCD of this embodiment, $\Delta n_{32} \cdot d_{32}$ of the color-compensating cell 302 and $\Delta n_{11} \cdot d_{11}$ of the display cell 101 are set to satisfy the following:

$$\Delta n_{32} \cdot d_{32} < \Delta n_{11} \cdot d_{11} < \Delta n_{32} \cdot d_{32} \times 1.10$$

Good black dots can be provided even when no voltage is applied to the dots and the dots are not selected.

If the thickness $d_{32}$ of the liquid crystal layer of the color-compensating cell 302 is increased, the refractive-index anisotropy $\Delta_{32}$ of the liquid crystal 313 of this cell 302 should simply be reduced accordingly to make $\Delta n_{32} \cdot d_{32}$ constant. It is, however, desirable that the material for the liquid crystal 313 used for the color-compensating cell 302 have the liquid crystal components of same basic chemical structure as that for the liquid crystal 113 of the display cell 101 and the blending ratio be changed to reduce the refractive-index anisotropy $\Delta n_{32}$. If the liquid crystal 313 of the color-compensating cell 302 is made of a material having the same basic structure as the material for the liquid crystal 113 of the display cell 101, a change in $\Delta n_{11}$ of the cell 101 with a change in temperature can be set nearly equal to a temperature-dependent change in $\Delta$ of the cell 301. Therefore, the condition of the above-given equation can be satisfied over a wide temperature range, and a good black and white display can always be realized irrespective of a change in temperature.

It should be noted that $\Delta n_{11} \cdot d_{11}$ and $\Delta n_{32} \cdot d_{32}$ be within a range to satisfy the following condition.

$$\Delta n_{32} \cdot d_{32} \leq \Delta n_{11} \cdot d_{11} \leq \Delta n_{32} \cdot d_{32} \times 10.5.$$

It is also preferable that the twist angles of the liquid crystal molecule alignments of both cells 101 and 302 be within a range of 180° to 270°. Further, although the color-compensating cell 302 is provided on the light-leaving side of the display cell 101 in the third embodiment, this cell 302 may be disposed on the light incident side of the cell 101.

Fourth Embodiment

This embodiment has a color-compensating cell made of a liquid crystal whose refractive-index anisotropy has low temperature-dependency, and can thus display data on a white background which does not become colored as a result of changes in temperature.

The fourth embodiment is different from the first embodiment (FIG. 1) in that the color-compensating cell is made of a liquid crystal whose refractive-index anisotropy $\Delta n$ depends less upon temperature than liquid material 123 of the color-compensating cell 102 incorporated in the first embodiment (FIG. 1). A liquid crystal suitable for the cell is one which has C-N point of $-25°$ C. or more and N-I point of 100° C. or more and which exhibits nematic phase over a broad range of temperatures. This material can be prepared by mixing the following liquid-crystal compounds 1, 2, 3 and the like, in an appropriate ratio:

1. Low-Viscosity Liquid Crystal (having low C-N point)

This is, for example, phenyl cyclohexane-base liquid crystal, which is represented by:

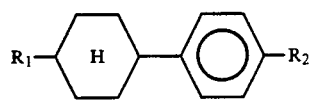

where $R_1$ is alkyl group, $R_2$ is alkyl group having 2 to 5 carbon atom or alkoxy group.

2. LC Exhibiting Great Positive Dielectric Anisotropy $\Delta \epsilon$

This is, for example, phenyl cyclohexane-base liquid crystal, which is identified by:

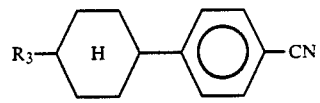

where $R_3$ is an alkyl group having 2 to 5 carbon atoms. Alternatively, it can be biphenyl-based liquid crystal, which is represented by:

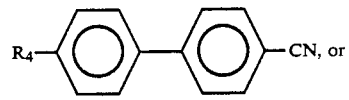

where $R_4$ and $R_5$ are alkyl groups having 2 to 5 carbon atoms.

3. High-Temperature LC (having a high N-I point)

This is, for example, biphenyl-base liquid crystal, which is identified by:

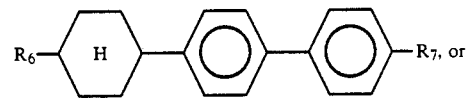

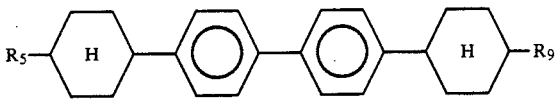

where $R_6$, $R_7$, $R_8$, and $R_9$ are alkyl groups having 2 to 5 carbon atoms.

The color-compensating cell is not applied with a drive voltage. Therefore, the molecules of the liquid crystal 123 are permanently twisted, and its electrooptical characteristics, such as response characteristic, need not be taken into consideration. Hence, the liquid crystal 123 of the color-compensating cell 102 is not limited to those for STN-LCDs. Rather, it can be any liquid crystal which exhibits nematic phase over a broad range of temperatures, for example, the liquid crystal which is used in the TN liquid-crystal display designed for use in automobiles. To twist the liquid-crystal molecules by a large angle, it suffices to mix an optically active substance, e.g., chiral liquid crystal, into the liquid crystal in an appropriate amount.

The refractive-index anisotropy $\Delta n_{12}$ and thickness $d_{12}$ of the liquid-crystal layer 123 incorporated in the color-compensating cell 102, and the refractive-index anisotropy $\Delta n_{11}$ and thickness $d_{11}$ of the liquid-crystal layer 113 incorporated in the display cell 101 are of such specific values that the product of $\Delta n_{12}$ and $d_{12}$, and the product of $\Delta n_{11}$ and $d_{11}$ have the following relation:

$$\Delta n_{12} \cdot d_{12} < \Delta n_{11} \cdot d_{11} < \Delta n_{12} \cdot d_{12} \times 1.10$$

The two-layered STN-LCD display data when its display cell 101 is multiplex-driven at high duty. The color-compensating cell 102 prevents the display cell 101 from being colored.

Figure 8:
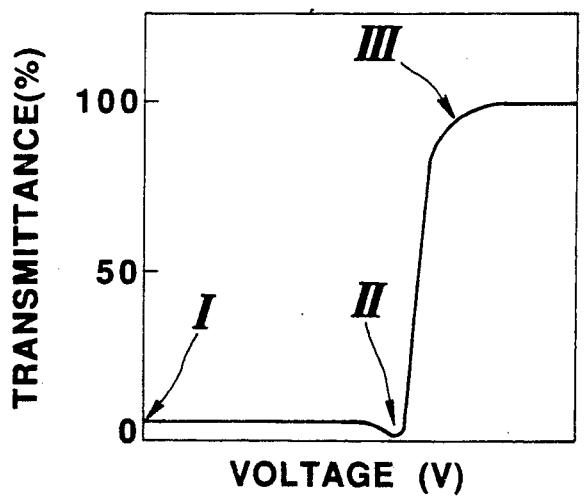
FIG. 8 is an electrooptical characteristic diagram obtained when a two-layered STN-LCD according to the fourth embodiment is multiplex-driven.

FIG. 8 is a graph representing the relationship which the transmittance of the two-layered STN-LCD and the drive voltage thereof have when this STN-LCD is multiplex-driven at high duty. As is evident from FIG. 8, the transmittance of the two-layered STN-LCD decreases to almost 0% when virtually no voltage is applied to the STN-LCD as is indicated by curve I, or when the STN-LCD is not selected as is indicated by curve II, in which case the screen of the STN-LCD is colored almost black. On the other hand, also as can be understood from FIG. 8, the transmittance of the STN-LCD increases to almost 100% when the STN-LCD is selected as is indicated by curve III, in which case the screen of the STN-LCD is colored white.

As has been pointed out, the color-compensating cell 102 incorporated in the two-layered STN-LCD according to the fourth embodiment is made of a liquid crystal which has low temperature-dependency. Hence, the product of its refractive-index anisotropy $\Delta n_{12}$ and its thickness $d_{12}$ remains virtually unchanged despite of changes in the temperature. Therefore, the STN-LCD according to the fourth embodiment can clearly display data in black on a white background, even if the product of $\Delta n_{11}$ and $d_{11}$ of the display cell 101 changes with temperature.

Figure 9:
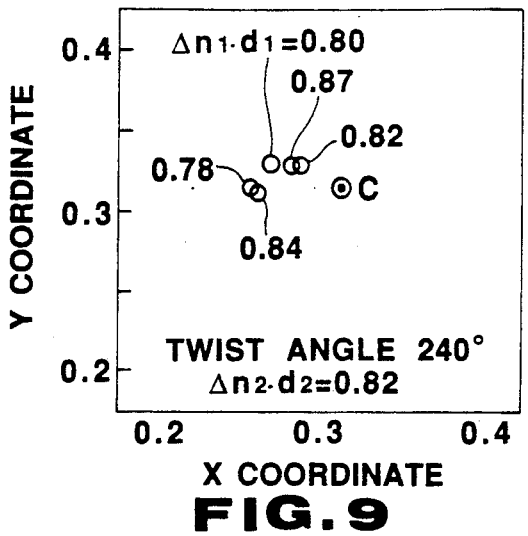
FIG. 9 is a CIE chromaticity diagram illustrating how the color of a display screen changes with a change in $\Delta n \cdot d$ of the display cell in the fourth embodiment.

FIG. 9 is a graph showing how the chromaticity of the white-background screen of the two-layered STN-LCD, i.e., the fourth embodiment, changes when the value of $\Delta n_{11} \cdot d_{11}$ is varied over the range of 0.78 to 0.87. In this STN-LCD, the liquid-crystal molecules of both the display cell 101 and the color-compensating cell are twisted by 240°, and the value of $\Delta n_{12} \cdot d_{12}$ is set at 0.82.

As can be understood from the chromaticity diagram, when the value of $\Delta n_{12} \cdot d_{12}$ is constant, the display color is identified by the white point C (i.e., the noncoloring point) even if the value of $\Delta n_{11} \cdot d_{11}$ changes. This is because the liquid crystal of the cell 102 less depends upon temperature than that of the display cell 101 (that is, the liquid crystal of the cell 101 the refractive-index $\Delta n_{12}$ of the liquid crystal of the cell 102 changes a little with temperature). The electrical characteristic and optical characteristic of this liquid crystal, therefore, change along with one the other. It follows that the color of the display screen of the STN-LCD remains virtually unchanged even if the refractive-index anisotropy $\Delta n_{11}$ of the liquid crystal layer 113 of the display cell 101 varies, inevitably changing the value of $\Delta n_{11} \cdot d_{11}$. Hence, the two-layered STN-LCD can achieve a good display even if the liquid crystal layer 113 of the display cell 101 undergoes a temperature change.

Figure 10:
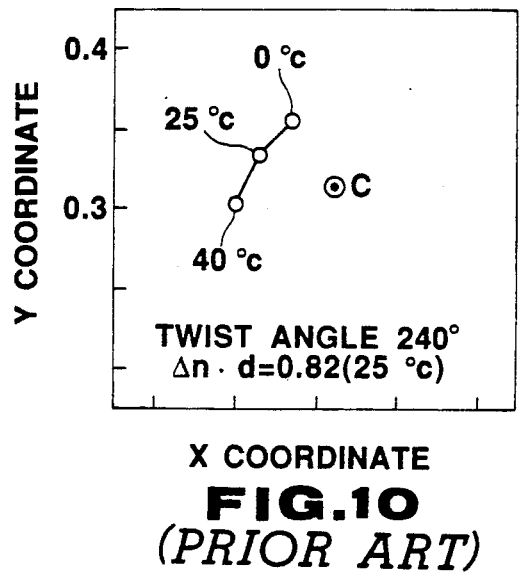
FIG. 10 is a CIE chromaticity diagram illustrating the temperature-dependency of the color of a display screen in the conventional two-layered STN-LCD.
Figure 11:
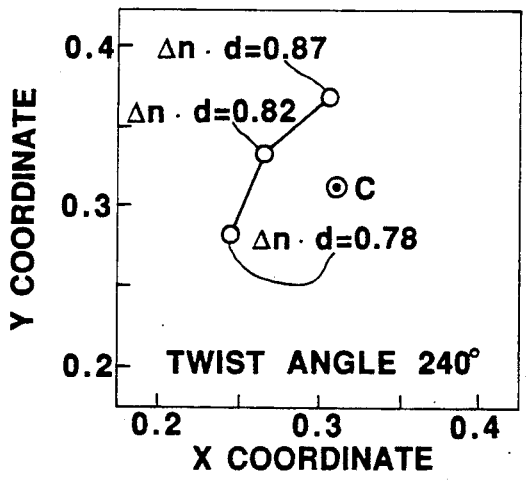
FIG. 11 is a CIE chromaticity diagram illustrating how the color of a display screen changes with a change in $\Delta n \cdot d$ of the display cell and color-compensating cell in the conventional two-layered STN-LCD.

FIGS. 10 and 11 are graphs illustrating how the optical characteristic of a conventional two-layered, liquid-crystal display changes with temperature. More specifically, FIG. 10 shows how the chromaticity of the display screen of the conventional display changes when the liquid crystal molecules forming both the display cell and the color-compensating cell are twisted by 240°, and the value of $\Delta n \cdot d$ is 0.82, where $\Delta n$ is the refractive-index anisotropy of the layer, and d is the thickness of thereof. FIG. 11 illustrates how the chromaticity of the white display of the conventional display changes when the liquid crystal molecules forming the display cell and the color-compensating cell are twisted by 240°, and the value of $\Delta n \cdot d$ is varied over a range of 0.78 to 0.87.

As is evident from FIG. 10, the display color assumes a color similar to white identified by the white point C (i.e., the non-coloring point) at the temperature of 25°. When the temperature falls to 0°, however, the display color is colored slightly yellow. When the temperature rises to 40°, the display color is colored somewhat blue. Further, as FIG. 11 clearly shows, the values of $\Delta n \cdot d$ of both cells change with temperature, and the color of the display screen changes with the value of $\Delta n \cdot d$ of either cell. Obviously, the display color of the conventional two-layered STN-LCD inevitably changes with temperature since the display cell and the color-compensating cell are made of liquid crystal materials whose refractive-index anisotropies depend upon temperature to the same degree.

In the fourth embodiment of the invention, it is desirable that the product of $\Delta n_{12}$ and $d_{12}$, and the product of $\Delta n_{11}$ and $d_{11}$ have the following relation:

$$\Delta n_{12} \cdot d_{12} < \Delta n_{11} \cdot d_{11} < \Delta n_{12} \cdot d_{12} \times 1.05$$

In this case, the dots of the STN-LCD is colored as black as desired, when virtually no voltage is applied to the dots or when the dots are not selected. Therefore, the two-layered STN-LCD according to the fourth embodiment can perform an excellent black and white display, regardless of changes in temperature.

The liquid crystal molecules of the display cell 101 and those of the color-compensating cell 102 can be twisted through by any angle ranging from 180° to 270°. In addition, the color-compensating cell 102 can be located on the light-receiving surface of the display cell 101, rather than on the light-emitting surface thereof.

Fifth Embodiment

This embodiment has a color-compensating cell which has such a thickness d and is made of a liquid crystal having such a refractive-index anisotropy $\Delta n$, that the product of $\Delta n$ and d is less that the product of the refractive-index anisotropy and thickness of the display cell, and also that the difference between the value of $\neq n \cdot d$ for the display cell and that for the color-compensating cell is greater at low temperature than at high temperatures. Thus, the display color of the two-layered STN-LCD remains unchanged despite of changes in temperature. The fifth embodiment is characterized in that the voltage of the drive signal is controlled in accordance with the temperature, to prevent the display color and electrooptical characteristic of the STN-LCD from changing.

The two-layered STN-LCD according to the fifth embodiment will now be described in greater detail, with reference to FIGS. 12 to 15.

Figure 12:
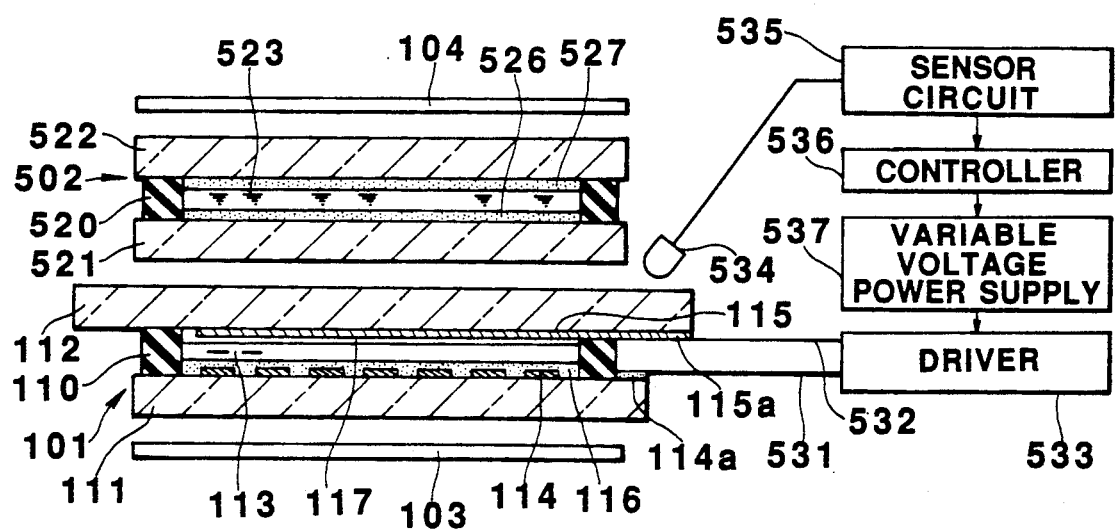
FIG. 12 is a cross-sectional view illustrating the schematic structure of a liquid crystal display device according to the fifth embodiment of the present invention.
Figure 13:
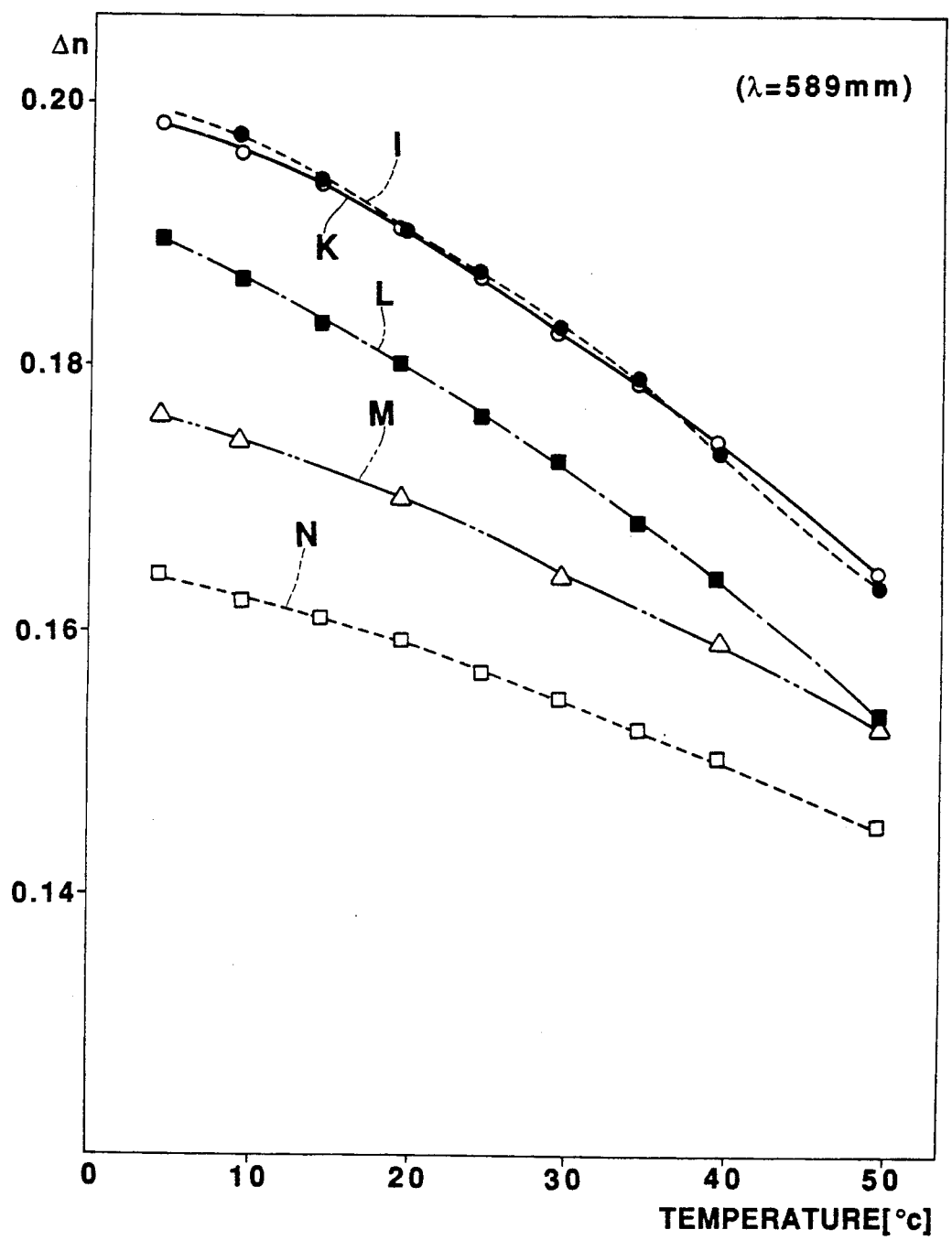
FIG. 13 is a graph showing the temperature-dependency of a refractive-index anisotropy $\Delta n \cdot d$ of a liquid crystal material used in the liquid crystal display device shown in FIG. 12.
Figure 14:
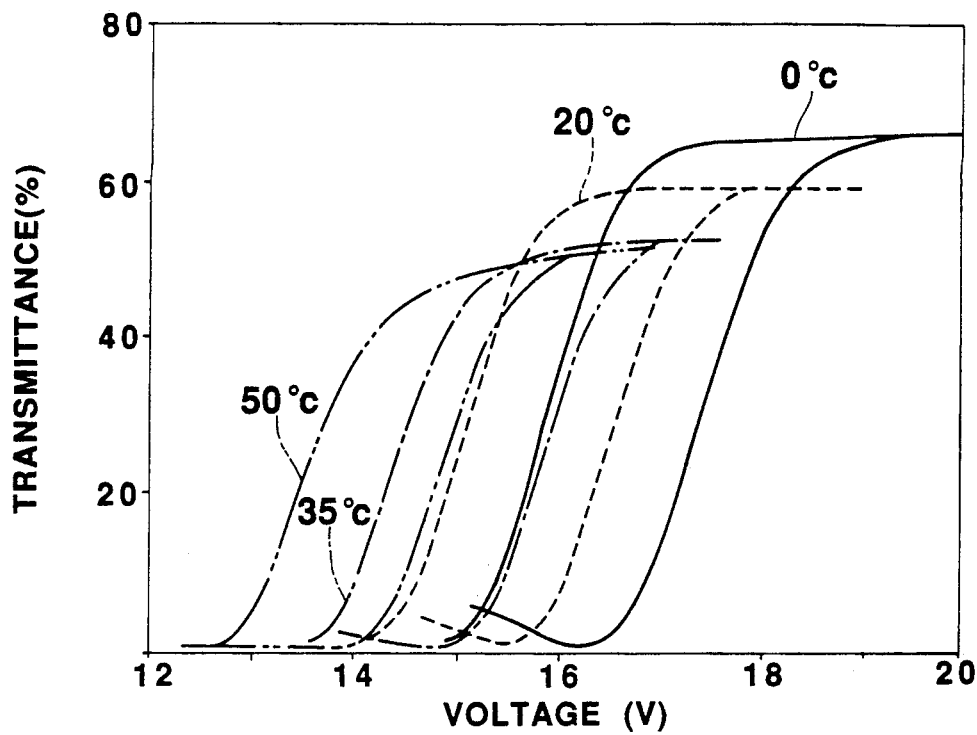
FIG. 14 is a graph illustrating an electrooptical characteristic of the liquid crystal display device shown in FIG. 12.

As can be seen from FIG. 12, this STN-LCD is identical to the first embodiment shown in FIG. 1, in the structure and position of the display cell 101 and also in the positions of two polarizing plates 103 and 104. Therefore, no explanation is made of the display cell or the polarizing plates. The STN-LCD has a color-compensating cell 502. Like the cell 102 shown in FIG. 1, this cell 502 comprises a lower substrate 521, an aligning film 526 formed on the lower substrate 521, an upper substrate 522, an aligning film 527 formed on the upper substrate 522, and a seal member 520 interposed between the substrates 521 and 522 and connecting these substrate to each other. Liquid crystal 523, which will be described later, is filled in the space defined by the seal member 520 and two horizontal-aligning films 526 and 527.

The aligning films 526 and 627, as well as the aligning films 116 and 117 formed on the opposing surfaces of the upper and lower substrates 111 and 112 of the display cell 101, have been processed in the directions specified in FIG. 2. Therefore, the molecules of the liquid crystal 113 of the display cell 101 are twisted by 160° to 270° in one direction, whereas those of the liquid crystal 523 are twisted by the same angle but in the opposite direction. The polarizing plates 103 and 104 are positioned such that their axes of polarization extend in the directions shown in FIG. 2.

As is shown in FIG. 12, the display cell 101 has two sets of electrodes. Terminals 114a extend from the electrodes 114 of the first set and are connected to a driver 533 by means of leads 531. Similarly, Terminals 115a extend from the electrodes 115 of the second set and are connected to the driver 533 by means of leads 532. The driver 533 supplies a multiplex-drive signal to the display cell 101. This signal is a voltage applied between the electrodes 114 of the first set, on the one hand, and the electrodes 115 of the second set, on the other. Hence, the display cell 101 is multiplex-driven.

The two-layered STN-LCD shown in Fi. 12 further comprises a temperature detector 534, a sensor circuit 535, a controller 536, and a variable-voltage power supply circuit 537. The sensor 534 is located close to the display cell 101 and/or the color-compensating cell 502. It detects the temperature of the display cell 101 and/or the color-compensating cell 502 and generates an electric signal representing this temperature. The electric signal is supplied to a sensor circuit 535. The sensor circuit 535 supplies the controller 536 with a signal or data representing the temperature the sensor 534 has detected. In response to this signal, the controller 536 generates a voltage control signal whose magnitude is, for example, inversely proportional to the signal supplied from the sensor circuit 535. The control signal, thus generated, is supplied to the control terminal of the variable-voltage power supply circuit 537. The circuit 537 applies a voltage, which is inversely proportional to the temperature detected by the sensor 534, to the driver 533. The driver 533 applies a voltage proportional to this voltage, between the electrodes 114, on the one hand, and the electrodes 115, on the other. The circuit 537 can be either of the type which changes the output voltage stepwise, or of the type which continuously changes the output voltage.

The liquid crystal 523 filled in the color-compensating cell 502 exhibits refractive-index anisotropy $\Delta n_{52}$ which is less than that $\Delta n_{11}$ of the liquid crystal 113 filled in the display cell 101. The refractive-index anisotropy $\Delta n_{52}$ depends on temperature in such a way that the difference between $\Delta n_{52}$ and $\Delta n_{11}$ is less at the lower region of the temperature range over which the STN-LCD can be used, than in the upper region of said temperature range. For instance, the refractive-index anisotropy $\Delta n_{52}$ depends on temperature, as is shown in Table 1, when both the layer of liquid crystal 113 and the layer of liquid crystal 523 have a thickness of 4 μm and the temperature range is from from 20° to 50°.

TABLE 1

| Temp. | $\Delta n_{11}$ | $\Delta n_{52}$ | $\Delta n_{11}-\Delta n_{52}$ | $\Delta n_{11}d_{11}-\Delta n_{52}d_{52}$ |
|---|---|---|---|---|
| 20° | 0.210 | 0.180 | 0.03 | 0.12 (μm) |

TABLE 1-continued

| Temp. | $\Delta n_{11}$ | $\Delta n_{52}$ | $\Delta n_{11}-\Delta n_{52}$ | $\Delta n_{11}d_{11}-\Delta n_{52}d_{52}$ |
|---|---|---|---|---|
| 30° | 0.196 | 0.169 | 0.027 | 0.108 (μm) |
| 40° | 0.180 | 0.160 | 0.02 | 0.08 (μm) |
| 50° | 0.160 | 0.155 | 0.005 | 0.02 (μm) |

Alternatively, the color-compensating cell 502 can be filled with liquid crystal whose refractive-index anisotropy $\Delta n_{52}$ depends upon temperature as is shown in Table 2, when both the layer of liquid crystal 113 and the layer of liquid crystal 523 have a thickness of 5 μm and the temperature range is from 0° to 50°.

TABLE 2

| Temp. | $\Delta n_{11}$ | $\Delta n_{52}$ | $\Delta n_{11}-\Delta n_{52}$ | $\Delta n_{11}d_{11}-\Delta n_{52}d_{52}$ |
|---|---|---|---|---|
| 0° | 0.200 | 0.180 | 0.02 | 0.100 (μm) |
| 20° | 0.180 | 0.167 | 0.013 | 0.065 (μm) |
| 40° | 0.160 | 0.158 | 0.02 | 0.010 (μm) |
| 60° | 0.155 | 0.155 | 0 | 0 (μm) |

As can be understood from Tables 1 and 2, it is desirable that the liquid crystal 113 and the liquid crystal 523 have refractive-index anisotropies $\Delta n_{11}$ and $\Delta n_{52}$ which depend upon temperature such that the difference between the value of $\Delta n_{11} \cdot d_{11}$ (where $d_{11}$ is the thickness of the liquid crystal layer 113) and the value of $\Delta n_{52} \cdot d_{52}$ (where $d_{52}$ is the thickness of the liquid crystal layer 523) is greater than 0 at the upper limit of the temperature range and is from 0.07 to 0.12 at at the lower limit of the temperature range. Preferably, the difference, $\Delta n_{11} \cdot d_{11} - \Delta n_{52} \cdot d_{52}$ is 0.07 to 0.10 at the lower limit of the temperature range.

Since $\Delta n_{11} \cdot d_{11} - \Delta n_{52} \cdot d_{52}$ is small at the higher limit of the temperature range over which the STN-LCD is used, the STN-LCD has not only a great maximum contrast CRmax but also a great maximum transmittance T%max over the temperature range. And, the display color can be compensated sufficiently over this temperature range.

In the conventional STN-LCD, the liquid crystal exhibits less prominent reflective-index anisotropy at high temperature than at low temperature. Hence, the transmittance of the LCD does not change so much at high temperatures. The maximum transmittance is low at high temperatures. As is evident from Table 3 representing the relationship between the difference $\Delta n_{11} \cdot d_{11} - \Delta n_{52} \cdot d_{52}$ and the electrooptical characteristics of the fifth embodiment, the less the difference $n_{11} \cdot d_{11} - \Delta n_{52} \cdot d_{52}$, the greater the maximum transmittance. Obviously, the fifth embodiment achieves a great maximum transmittance even in the higher region of the temperature range.

TABLE 3

| Display Cell ($\Delta n_{11} \cdot d_{11}$) | Compensating Cell ($\Delta n_{52} \cdot d_{52}$) | Drive Voltage (Vop) | Contrast (CR) | Max Transmittance (T % max) |
|---|---|---|---|---|
| 0.74 | 0.74 | 19.4 V | 90 | 18.5% |
| 0.74 | 0.70 | 20.0 | 80 | 14.0 |
| 0.74 | 0.67 | 20.3 | 30 | 10.0 |

In the low region of the temperature range, the refractive-index anisotropy of either liquid crystal layer is great. Therefore, the maximum transmittance and the maximum contrast decreases but very little. Further, the value of $\Delta n_{52} \cdot d_{52}$ is less than the value of $\Delta n_{11} \cdot d_{11}$, the display color can be compensated sufficiently.

As has been described, $\Delta n_{52} \cdot d_{52}$ is less than $\Delta n_{11} \cdot n_{11}$, and less depends upon temperature than $\Delta n_{11} \cdot d_{11}$. As long as $\Delta n_{52}$ is less depends on temperature than $\Delta n_{11}$, $\Delta n_{52}$ and $\Delta n_{11}$ can take away values. Further, both $\Delta n_{52} \cdot d_{52}$ and $\Delta n_{11} \cdot d_{11}$ can be changed to any values, if necessary, by varying the thicknesses $d_{11}$ and $d_{52}$ of the liquid crystal layers 113 and 523. In this embodiment, the molecules of either liquid crystal should preferably be twisted by 160° to 270°, and more preferably by 220° to 240°. As for the thickness of either liquid crystal layer, the value should better be 5μ or less.

The physical properties of liquid crystals I, K, L, M, and N which can be used in the present invention are listed in Table 4. These liquid crystals exhibit the electrooptical characteristics illustrated in FIG. 13. As is seen from FIG. 13, liquid crystals M and N have refractive-index anisotropies which are less prominent than, and also less depend upon temperature than, those of liquid crystals I, K, and L. Therefore, liquid crystals M and N are used for the color-compensating cell 502, whereas liquid crystals I, K, and L are used for the display cell 101.

TABLE 4

| LC | NI Point | SN Point | ΔN | Viscosity |
|---|---|---|---|---|
| I | 79.9° C. | −30° C. | 0.187 | 23.3 |
| K | 83.9° C. | −47° C. | 0.184 | 19.7 |
| L | 79.8° C. | −30° C. | 0.175 | 18.9 |
| M | 103.8° C. | −32° C. | 0.167 | 20.8 |
| N | 112° C. | −49° C. | 0.156 | 26.9 |

The inventors hereof made various examples of the fifth embodiment (FIG. 12). These examples will now be described in detail.

EXAMPLE 1

Liquid crystal K shown in Table 4 was filled in the display cell 101, thus forming a liquid crystal layer having a thickness of 4.0 μm. Also, liquid crystal M shown in Table 4 was filled in the color-compensating cell 502, thereby forming a liquid crystal layer having a thickness of 4.2 μm. Further, the molecules of both liquid crystals K and M were twisted by 220°, thereby manufacturing a two-layered STN-LCD. This STN-LCD had the electrooptical characteristics shown in Table 5:

TABLE 5

| | Charac- | (Example 1) Temp. | | | |
|---|---|---|---|---|---|
| | teristics | 0° C. | 20° C. | 35° C. | 50° C. |
| Example 1 | Contrast | 130 | 76 | 50 | 60 |
| | T_ON (msec) | 213 | 104 | 77 | 57 |
| | T_OFF (msec) | 146 | 78 | 65 | 33 |
| | Vop (V) | 20.6 | 19.5 | 18.6 | 17.2 |

A Comparative Example was made which was identical to Example 1, except in that both the display cell and the color-compensating cell were filled with liquid crystal K. Comparative Example exhibited the electrooptical characteristics shown in Table 6:

TABLE 6

| Charac- | (Comparative Example) Temp. | | | |
|---|---|---|---|---|
| teristics | 0° C. | 20° C. | 35° C. | 50° C. |
| Contrast | 210 | 70 | 28 | 13 |
| T_ON (msec) | 199 | 92 | 49 | 36 |
| T_OFF (msec) | 191 | 84 | 55 | 57 |
| Vop (V) | 20.6 | 19.7 | 19.0 | 18.0 |

Example 1 is characterized in that the liquid crystal layer 523 contained in the color-compensating cell 502 is thicker than the crystal layer 113 incorporated in the display cell 101. The liquid crystal 523 exhibits refractive-index anisotropy of 0.7014 at room temperature, whereas the liquid crystal 113 exhibited refractive-index anisotropy of 0.736 at room temperature. As can be clearly seen from Tables 5 and 6, at 50° C. Example 1 had contrast more than four times greater than Comparative Example. Further, it responded at 0° C. faster than Comparative Example. Although the contrast achieved by Example 1 at 0° C. is lower than that achieved by Comparative Example, it is more than 60 and is practically sufficient.

In Tables 5 and 6, "Contrast" is the maximum one which Example 1 or Comparative Example can achieve at the respective temperature, Vop is the voltage applied to the liquid crystal layer to achieve the maximum contrast, $T_{ON}$ is the time the liquid crystal molecules need to be fully energized after the drive voltage has been applied to them, and $T_{OFF}$ the molecules require to be fully de-energized after the supply of the drive voltage has been stopped.

EXAMPLE 2

Liquid crystal L shown in Table 4 was filled in the display cell 101, thus forming a liquid crystal layer having a thickness of 4.2 μm. Also, liquid crystal M shown in Table 4 was filled in the color-compensating cell 502, thereby forming a liquid crystal layer having a thickness of 4.2 μm, too. Further, the molecules of both liquid crystals L and M were twisted by 220°, thereby manufacturing a two-layered STN-LCD. This STN-LCD had the electrooptical characteristics shown in Table 7:

TABLE 7

| Bias Ratio | Charac-teristics | (Example 2) Temp. | | | |
|---|---|---|---|---|---|
| | | 0° C. | 20° C. | 35° C. | 50° C. |
| 1/8 | Contrast | 124 | 92 | 88 | 110 |
| | T_ON (msec) | 246 | 109 | 80 | 85 |
| | T_OFF (msec) | 123 | 78 | 67 | 61 |
| | Vop (V) | 15.5 | 15.3 | 14.8 | 13.8 |
| 1/9 | Contrast | 138 | 81 | 79 | 104 |
| | T_ON (msec) | 251 | 109 | 86 | 84 |
| | T_OFF (msec) | 120 | 77 | 68 | 62 |
| | Vop (V) | 16.7 | 16.5 | 15.9 | 14.9 |

Example 2 is characterized in that the liquid crystal layers of both cells 101 and 502 had the same thickness, but exhibited different refractive-index anisotropies. As is evident from Table 7, Example 2 achieved good contrast of about 80 or more over the temperature range of 0° C. to 50° C., and responded sufficiently fast, whether the bias ratio was ⅛ or 1/9.

EXAMPLE 3

Liquid crystal I shown in Table 4 was filled in the display cell 101, thus forming a liquid crystal layer having a thickness $d_{11}$ of 4.0 μm. Also, liquid crystal M shown in Table 4 was filled in the color-compensating cell 502, thereby forming a liquid crystal layer having a thickness $d_{52}$ of 4.2 μm. Further, the molecules of both liquid crystals L and M were twisted by 220°, thereby manufacturing a two-layered STN-LCD. This STN-LCD had the electrooptical characteristics shown in Table 5 and also FIGS. 14 and 15:

TABLE 8

(Example 3)

| Bias Ratio | Charac- teristics | Temp. | | | |
|---|---|---|---|---|---|
| | | 0° C. | 20° C. | 35° C. | 50° C. |
| 1/9 | Contrast | 107 | 79 | 72 | 83 |
| | $T_{ON}$ (msec) | 235 | 95 | 63 | 69 |
| | $T_{OFF}$ (msec) | 145 | 59 | 46 | 38 |
| | Vop (V) | 16.3 | 15.5 | 14.8 | 13.7 |

In Example 3, the liquid crystal layer 523 of the color-compensating cell 502 is thicker than the liquid crystal layer 113 of display cell 101. At room temperature, $\Delta n \cdot d$ of the layer 523 is 0.7014, $\Delta n \cdot d$ of the layer 113 is 0.748. As is evident from FIGS. 14 and 15, the difference between $\Delta n_{11} \cdot d_{11}$ and $\Delta n_{52} \cdot d_{52}$ is extremely small at high temperatures. Therefore, Example 3 can provide high contrast at high temperatures, and responds fast at low temperatures.

Figure 16:
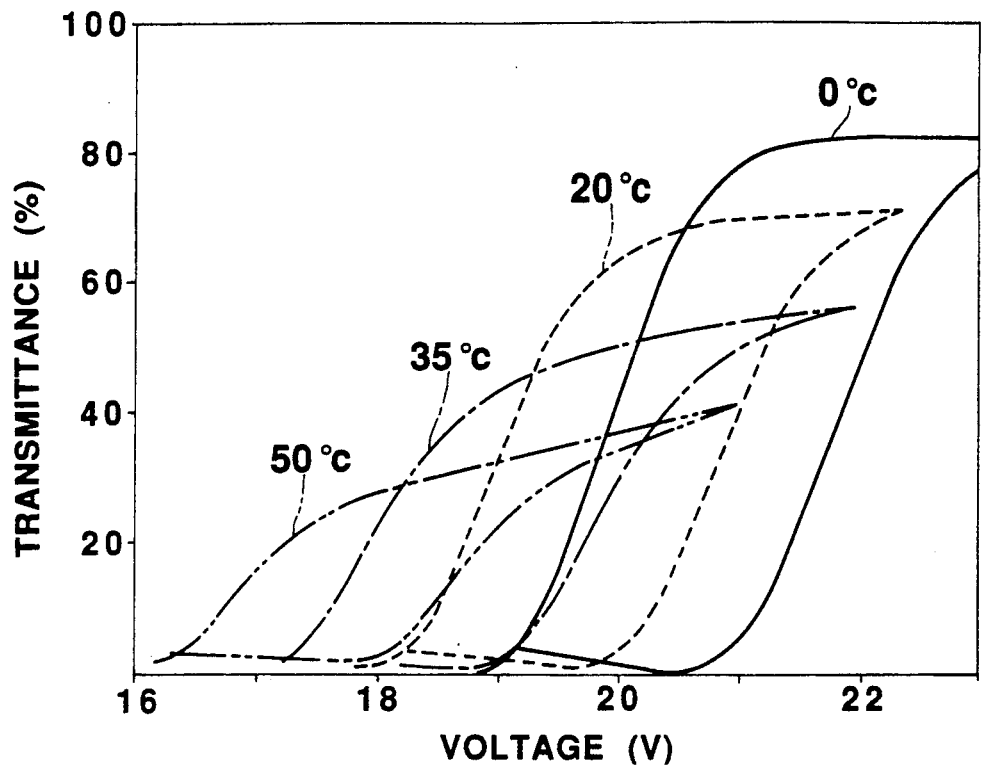
FIG. 16 is a graph showing an electrooptical characteristic of the conventional two-layered STN-LCD.
Figure 17:
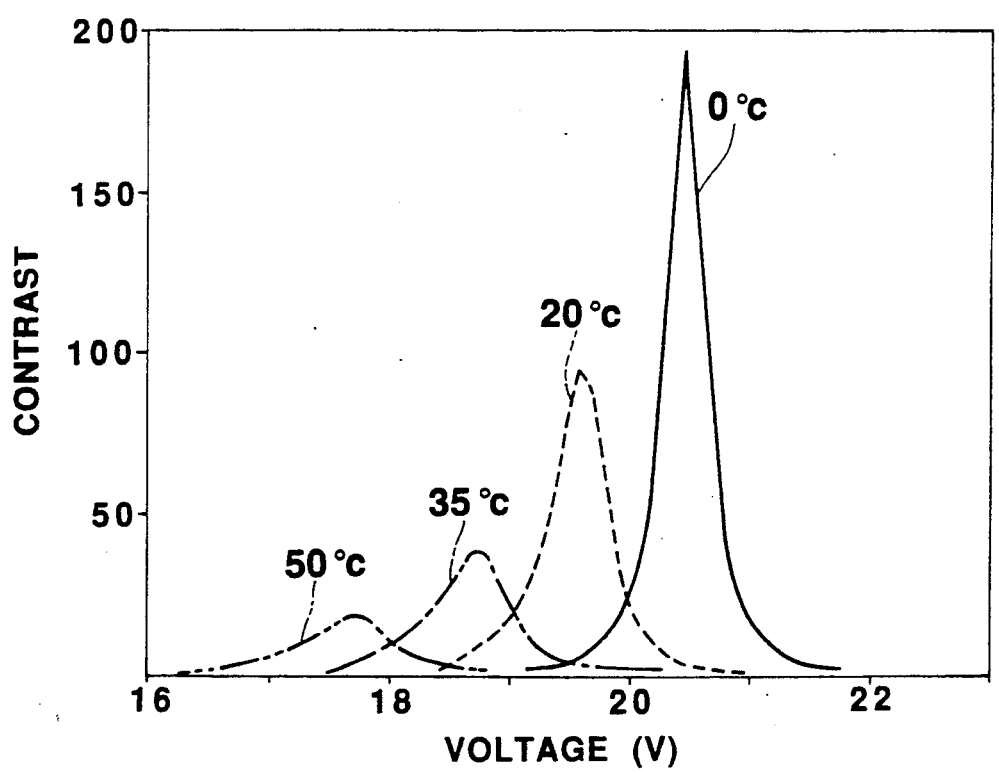
FIG. 17 is a graph illustrating the contrast computed on the basis of the electrooptical characteristic shown in FIG. 16

A Comparative Example was made which was identical to Example 3, except in that both the display cell and the color-compensating cell were filled with liquid crystal K. The refractive-index anisotropy $\Delta n$ of liquid crystal layers is small at a high temperature of 50° C. Hence, the value of $\Delta n \cdot d$ of either liquid crystal layer was small at 50° C. Consequently, the transmittance of Comparative Example did not change sharply as shown in FIG. 16. As is clearly shown in FIG. 17, the maximum contrast was too low at high temperatures.

In the fifth embodiment shown in FIG. 12, the driver 533 drives the display cell 101 in accordance with the signal output from the controller 536 and representing the temperature of the cell 101 or 502 which has been detected by the sensor 534 and processed by the sensor circuit 535. To be precise, the driver 533 applies a drive signal of +2 Vop to the selected portions of the liquid crystal layer 113 which are to be energized, and a drive signal of 1/9 2 Vop to 1/10 2 Vop to the unselected portions of the layer 113. Still more precisely, the driver 533 applies a voltage of 0 V to +Vop to the electrodes 115, and a voltage of 0 V to −Vop to the electrodes 114. The controller 536 controls the voltages applied to the electrodes 114 and 115, in accordance with the temperature detected by the sensor 534. The lower the temperature, the higher the voltage of the drive signal, and vice versa. Since the drive voltage is thus controlled in accordance with the temperature of the liquid crystal layer 113, the two-layered STN-LCD responds fast at low temperatures (e.g., 0°), and has high transmittance at high temperatures (50° to 80°). In addition, the STN-LCD can display a black and white image.

Figure 15:
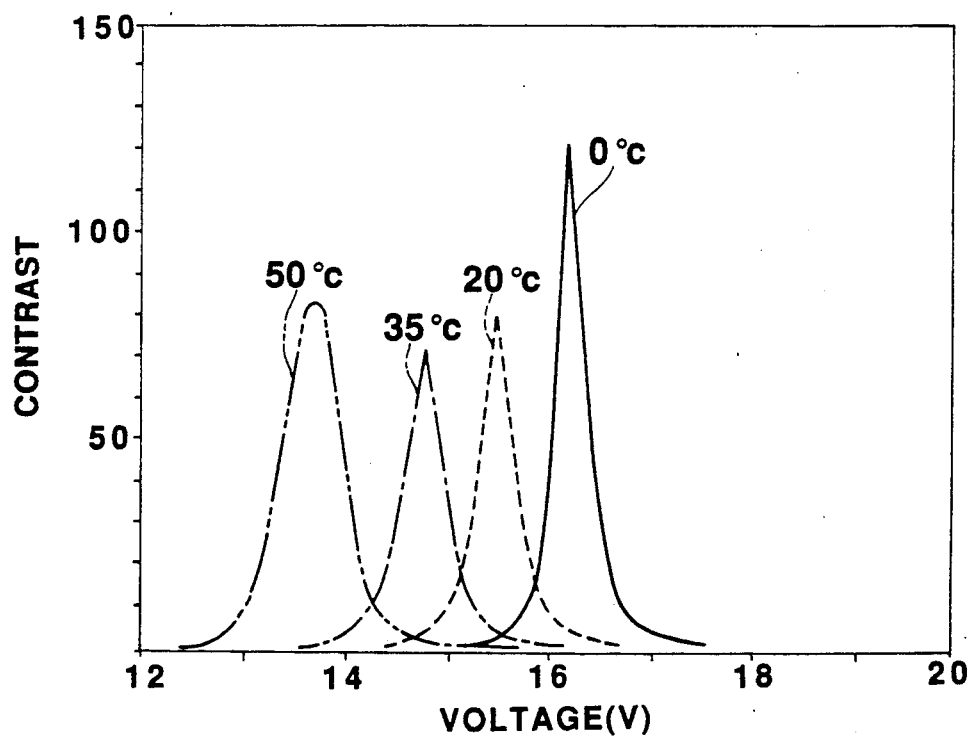
FIG. 15 is a graph illustrating the contrast computed on the basis of the electrooptical characteristic shown in FIG. 14.

As can be understood from Tables 5, 7, and 8, and also from FIG. 15, the higher the temperature, the lower the voltage Vop of the drive signal which should be supplied to the display cell 101 to achieve a maximum contrast. In other words, the controller 536 controls the variable-voltage power supply 537 such that the driver 533 applies a drive signal of a high voltage to the display cell 101 when the temperature is low, and a drive signal of a low voltage thereto when the temperature is high, whereby the STN-LCD achieves a sufficiently high contrast at any temperature falling within the range over which the STN-LCD can operate.

In Example 1 whose electrooptical characteristics are shown in Table 5, the voltage Vop should be 20.6 V when the temperature is 0° C., 19.5 V when the temperature is 20° C., 18.6 V when the temperature is 35° C., and 17.2 V when the temperature is 50° C. In other words, it is desirable that the voltage Vop be continuously changed 3.4 V over the temperature range of 0° C. to 50° C.

In Example 2, whose electrooptical characteristics are shown in Table 7, the voltage Vop should be changed from 16.7 V to 14.9 V, that is, by 1.8 V, over the temperature range of 0° C. to 50° C., if the bias ratio is 1/9. In Example 3 whose electrooptical characteristics are shown in Table 8, the voltage Vop should be changed from 16.3 V to 13.7 V, that is, by 2.6 V, over the temperature range of 0° C. to 50° C.

Since the voltage of the drive signal is controlled in the manner specified above, the high drive voltage compensates for the reduction in the response speed at the low temperatures (e.g., 0°), said speed reduction resulting from the low viscosity of the liquid crystal. Further, at low temperatures, the bias voltage is high due to the application of the high drive voltage, and the liquid crystal molecules forming any non-selected pixel have a great tilt angle, thus reducing the value of $\Delta n_{11} \cdot d_{11}$. The liquid crystal 523 filled in the anisotropy $\Delta n$ which depends upon temperature such that the difference between $\Delta n_{11} \cdot d_{11}$ and $\Delta n_{52} \cdot d_{52}$ increases at high temperatures, thereby to compensate for the reduction of $\Delta n_{11} \cdot d_{11}$. Hence, the display color can be appropriately compensated at low temperatures.

At high temperatures, on the other hand, the bias voltage is low due to the application of the low drive voltage, and the liquid crystal molecules forming any non-selected pixel have a small tilt angle, thus reducing the value of $\Delta n_{11} \cdot d_{11}$. The liquid crystal 523 filled in the color-compensating cell 502 has refractive-index anisotropy $\Delta n$ which depends upon temperature such that the difference between $\Delta n_{11} \cdot d_{11}$ and $\Delta n_{52} \cdot d_{52}$ is small at high temperatures. Hence, the display color can be appropriately compensated at high temperatures, too.

Therefore, the display color of the STN-LCD according to the fifth embodiment can be compensated appropriately at any temperature within the range over which the STN-LCD can operate. In other words, the display screen of the STN-LCD is not colored despite the changes in temperature over said range. Moreover, since the difference between the value of $\Delta n_{11} \cdot d_{11}$ for the display cell 101 and the value of $\Delta n_{52} \cdot d_{52}$ for the color-compensating cell 502 is small at high temperatures, the STN-LCD can have a great maximum transmittance.

In all embodiments described above, i.e., the first to the fifth embodiment, the display cell and the color-compensating cell are formed independent of each other, and located one upon the other. The present invention is not limited to this structure. For example, three substrates can be used, such that the display cell and the color-compensating cell are formed integral, as is illustrated in FIG. 18.

Figure 18:
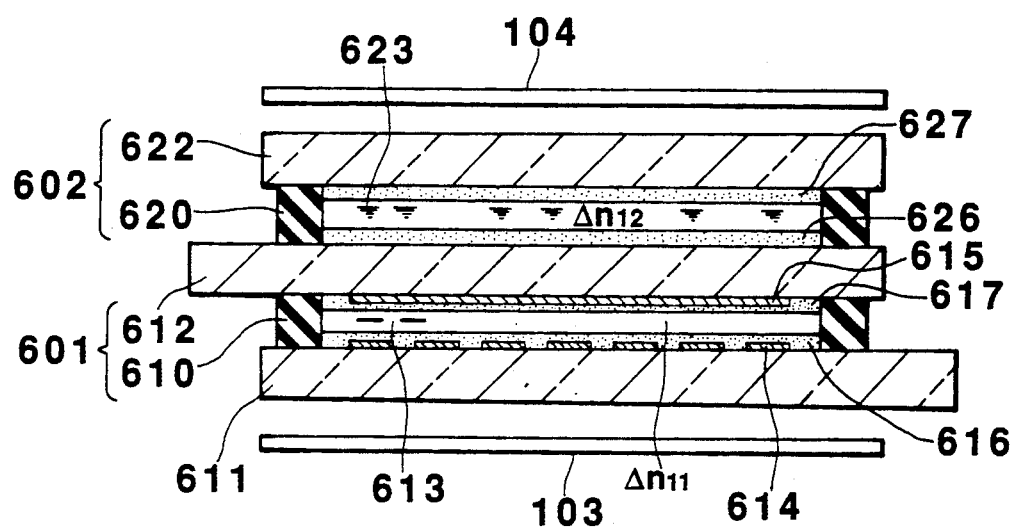
FIG. 18 is a cross-sectional view illustrating a modification of the liquid crystal display devices according to the first to fifth embodiments.

As is shown in FIG. 18, the sixth embodiment comprises three substrates 611, 612, and 622 which are located one above another, set a part from each other at predetermined gaps. A seal member 610 is interposed between the substrates 611 and 612, and a seal member 620 is interposed between the substrates 612 and 622, whereby the substrates 611, 612, and 622 are combined integral into one piece.

A number of electrodes 614 are arranged o the upper surface of the lower substrate 611, and an aligning film 616 covers the electrodes 614. Electrodes 615 are formed on the lower surface of the intermediate substrate 612, thus opposing the electrodes 614 arranged on the lower substrate 611. An aligning film 617 covers the electrodes 615. Liquid crystal 613 is filled in the gap between the aligning films 616 and 617. The lower substrate 611, the intermediate substrate 612, the electrodes 614 and 615, the films 616 and 617, and the liquid crystal 613 constitute a display cell 601.

An aligning film 626 is formed on the upper surface of the intermediate substrate 612, and an aligning film 627 is formed on the lower surface of the upper substrate 622. Hence, these films 626 and 627 oppose each other. Liquid crystal 623 is filled in the gap between the aligning films 626 and 627. The intermediate substrate 612, the upper substrate 622, the aligning films 626 and 627, and the liquid crystal 623 constitute a color-compensating cell 602.

Two polarizing plates 103 and 104 sandwich the unit comprised of the cells 601 and 602 combined integral. The sixth embodiment shown in FIG. 18 is identical to the first to the fifth embodiment in any other structural aspect. In other words, the sixth embodiment is different from the first to fifth embodiments, only in that the intermediate substrate 612 replaces the two substrates which are arranged in back-to-back relation in the first to fifth embodiments. Therefore, the STN-LCD according to the sixth embodiment attain the same advantages as the first to the fifth embodiment.

As has been described in detail, the present invention can provide a two-layered STN-LCD which can display a black and white image, the image is colored. Since the color-compensating cell of the STN-LCD contains liquid crystal whose refractive-index anisotropy depends very little upon temperature, the display color can be compensated appropriately over a broad range of temperatures. Hence, the two-layered STN-LCD can be used over such a broad temperature range.

The two-layered STN-LCD according to the present invention is good for use in color liquid-crystal displays, wherein each pixel is equipped with a color filter. The STN-LCD according to the invention, which has a temperature-compensating circuit, responds to a drive signal at relatively high speed. Hence, it can efficiently operates when incorporated into a motionpicture display such as a television set.

What is claimed is:

1. A liquid crystal display device, comprising:
first, second and third substrates opposing one another;
a first set of electrodes formed on a surface of said first substrate which opposes said second substrate;
a second set of electrodes formed on a surface of said second substrate which opposes said first substrate, and located in face-to-face relationship with at least one of said electrodes of the first set;
a first aligning film formed on at least one part of said first substrate and also on said electrodes of the first set, and subjected to an aligning treatment such that liquid-crystal molecules existing near the first aligning film have a predetermined pre-tilt angle and are aligned in a first direction;
a second aligning film formed on at least one part of said second substrate and also on said electrodes of the second set, and subjected to an aligning treatment such that liquid-crystal molecules existing near the second aligning film have a predetermined pre-tilt angle and are aligned in a second direction;
first nematic liquid crystal interposed between said first substrate and said second substrate and having a desired retardation $\Delta n_1 \cdot d_1$ which changes with temperature, where $\Delta n_1$ is the refractive-index anisotropy of the first nematic liquid crystal and $d_1$ is the thickness of the layer of the liquid crystal, the molecules of said first nematic liquid crystal being twisted, from a first direction in which liquid crystal molecules near the first aligning film are aligned to a second direction in which liquid crystal molecules near the second aligning film are aligned, by a first twist angle of 160° to 270° in a first rotation direction;
a third aligning film formed on another surface of said second substrate, and subjected to an aligning treatment such that liquid-crystal molecules near the third aligning film have a predetermined pre-tilt angle and are aligned in a third direction which is substantially at right angles to said second direction;
a fourth aligning film formed on at least one part of a surface of said third substrate which opposes said second substrate, and subjected to an aligning treatment such that liquid-crystal molecules existing near the fourth aligning film have a predetermined pre-tilt angle and are aligned in a fourth direction deviating from said third direction by an angle equal to said first twist angle;
second nematic liquid crystal interposed between said second substrate and said third substrate and having a desired retardation $\Delta n_2 \cdot d_2$, where $\Delta n_2$ is the refractive-index anisotropy of the second nematic liquid crystal and $d_2$ is the thickness of the layer of the liquid crystal, which retardation changes with temperature at a rate less than that of the retardation $\Delta n_1 \cdot d_1$ of said first nematic liquid crystal and which is less than the retardation $\Delta n_1 \cdot d_1$ of said first nematic crystal, the molecules of said second nematic liquid crystal being twisted, from the third direction to the fourth direction by a second twist angle equal to said first twist angle in a second rotation direction, which is opposite to said first rotation direction;
first and second polarizing plates located outside said first substrate and said third substrate, respectively, the first polarizing plate having a polarizing axis crossing a direction in which the liquid crystal molecules are aligned on said substrate adjacent to the first polarizing plate, at an angle ranging from 35° to 50°, and the second polarizing plate having an optical axis crossing the optical axis of the first polarizing plate substantially at right angles.

2. A liquid crystal display device according to claim 1, wherein the retardation $\Delta n_1 \cdot d_1$ of said first nematic liquid crystal is 1.0 to 1.1 times as large as the retardation $\Delta n_2 \cdot d_2$ of said second nematic liquid crystal.

3. A liquid crystal display device according to claim 1, wherein said third aligning film and said fourth aligning film are made of such an insulating film and said second nematic liquid crystal has a pre-tilt angle greater than the pre-tilt angle which said first nematic liquid crystal has in an initial aligning state.

4. A liquid crystal display device according to claim 1, wherein the pre-tilt angle which said second nematic liquid crystal has in an initial aligning state is different by 15° from the pre-tilt angle which said first nematic liquid crystal has in an initial aligning state.

5. A liquid crystal display device according to claim 1, wherein said second nematic liquid crystal layer having a thickness of $d_2$ equal to the thickness $d_1$ of the layer formed by said fist nematic liquid crystal, and a refractive-index anisotropy $\Delta n_2$ less than the refractive-index anisotropy $\Delta n_1$ of said first nematic liquid crystal.

6. A liquid crystal display device according to claim 1, wherein said second nematic liquid crystal forms a layer having a thickness of $d_2$ greater than the thickness $d_1$ of the layer formed by said first nematic liquid crystal, and a refractive-index anisotropy $\Delta n_2$ less than the refractive-index anisotropy $\Delta n_1$ of said first nematic liquid crystal.

7. A liquid crystal display device according to claim 1, wherein the difference between the retardation $\Delta n_1 \cdot d_1$ of said first nematic liquid crystal and the retardation $\Delta n_2 \cdot d_2$ of said second nematic liquid crystal decreases as temperature rises in a specified range.

8. A liquid crystal display device according to claim 7, wherein the difference between the retardation $\Delta n_1 \cdot d_1$ and the retardation $\Delta n_2 \cdot d_2$ is greater than 0 when a temperature at which the liquid crystal display device is used is maximized, and is 0.07 through 0.12 when the temperature is minimized.

9. A liquid crystal display device according to claim 7, wherein the difference between the refractive-index anisotropy $\Delta n_1$ of said first nematic liquid crystal and the refractive-index anisotropy $\Delta n_1$ of said second nematic liquid crystal increases as temperature falls, and said second nematic liquid crystal forms a layer having a thickness $d_2$ greater than the thickness $d_1$ of a layer formed by said first nematic liquid crystal.

10. A liquid crystal display device according to claim 1, wherein the difference between the refractive-index anisotropy $\Delta n_1$ of said first nematic liquid crystal and the refractive-index anisotropy $\Delta n_1$ of said second nematic liquid crystal increases as temperature falls.

11. A liquid crystal display device according to claim 1, wherein the molecules of said first nematic liquid crystal and the molecules of said second nematic liquid crystal are twisted by an angle ranging from 220° to 240°.

12. A liquid crystal display device, comprising:
a first liquid crystal display unit comprising:
first and second substrates opposing one another;
a first set of electrodes formed on a surface of said first substrate which opposes said second substrate;
a second set of electrodes formed on a surface of said second substrate which opposes said first substrate, and located in face-to-face relationship with at least one of said electrodes of the first set;
a first aligning film formed on at least one part of said first substrate and also on said electrodes of the first set, and subjected to an aligning treatment such that liquid-crystal molecules near the first aligning film are aligned in a first direction;
a second aligning film formed on at least one part of said second substrate and also on said electrodes of the second set, and subjected to an aligning treatment such that liquid-crystal molecules near the second aligning film have a predetermined pre-tilt angle and are aligned in a second direction; and
first nematic liquid crystal interposed between said first substrate and said second substrate and having a desired retardation $\Delta n_1 \cdot d_1$ which changes with temperature, where $\Delta n_1$ is the refractive-index anisotropy of the first nematic liquid crystal and $d_1$ is the thickness of the layer of the liquid crystal, the molecules of said first nematic liquid crystal being twisted, from the first direction to the second direction by a first twist angle ranging from 160° to 270° in a first rotation direction;
a second liquid display unit comprising:
third and fourth substrates opposing each other;
a third aligning film formed on at least one part of a surface of said substrate which opposes said fourth substrate, and subjected to an aligning treatment such that liquid-crystal molecules near the third aligning film are aligned in a third direction which is substantially at right angles to said second direction;
a fourth aligning film formed on at least one part of a surface of said fourth substrate which opposes said third substrate, and surface-treated such that liquid-crystal molecules near the fourth aligning film are aligned in a fourth direction deviating from said said third direction by an angle equal to said first twist angle; and
second nematic liquid crystal interposed between said third substrate and said fourth substrate and having a desired retardation $\Delta n_2 \cdot d_2$, where $\Delta n_2$ is the refractive-index anisotropy of the second nematic liquid crystal and $d_2$ is the thickness of the layer of the liquid crystal, which retardation changes with temperature at a rate less than that of the retardation $\Delta n_1 \cdot d_1$ of said first nematic liquid crystal and which is less than the retardation $\Delta n_1 \cdot d_1$ of said first nematic liquid crystal, the molecules of said first nematic liquid crystal being twisted, from the third direction to the fourth direction by a second twist angle equal to said first twist angle in a second rotation direction, which is opposite to said first rotation direction; and
first and second polarizing plates located outside said first substrate and said fourth substrate, respectively, the first polarizing plate having an optical axis crossing a direction in which the liquid crystal molecules are aligned on said substrate adjacent to the first polarizing plate at an angle ranging from 35° to 50°, and the second polarizing plate having an optical axis crossing the optical axis of the first polarizing plate substantially at right angles.

13. A liquid crystal display device according to claim 12, wherein said third and fourth aligning films are made of such an insulating film that said second nematic liquid crystal has a pre-tilt angle greater than the pre-tilt angle which said first nematic liquid crystal has in an initial aligning state, the retardation $\Delta n_1 \cdot d_1$ of said first nematic liquid crystal being 1.0 to 1.1 times as large as the retardation $\Delta n_2 \cdot d_2$ of said second nematic liquid crystal.

14. A liquid crystal display device, comprising:
a first liquid crystal display unit comprising:
first and second substrates opposing each other;
a first set of electrodes formed on a surface of said first substrate which opposes said second substrate;
a second set of electrodes formed on a surface of said second substrate which opposes said first substrate, and located in face-to-face relationship with at least one of said electrodes of the first set;
a first aligning film formed on at least one part of said first substrate and also on said electrodes of the first set, and subjected to an aligning treatment such that liquid-crystal molecules near the first aligning film are aligned in a first direction;

a second aligning film formed on at least one part of said second substrate and also on said electrodes of the second set, and subjected to an aligning treatment such that liquid-crystal molecules near the first aligning film are aligned in a second direction; and first nematic liquid crystal interposed between said first substrate and said second substrate and having a desired retardation $\Delta n_1 \cdot d_1$ which changes with temperature, where $\Delta n_1$ is the refractive-index anisotropy of the first nematic liquid crystal and $d_1$ is the thickness of the layer of the liquid crystal, the molecules of said first nematic liquid crystal being twisted, from the first direction, by a first twist angle ranging from 160° to 270° in a first rotation direction;

a second liquid display unit stacked on said first liquid display unit, comprising:

third and fourth substrates opposing each other;

a third aligning film formed on at least one part of a surface of said third substrate which opposes said fourth substrate, and subjected to an aligning treatment such that liquid-crystal molecules near the third aligning film are aligned in a third direction which is substantially at right angles to said second direction;

a fourth aligning film formed on at least one part of a surface of said fourth substrate which opposes said third substrate, and subjected to an aligning treatment such that liquid-crystal molecules near the fourth aligning film are aligned in a fourth direction deviating from said third direction by an angle equal to said first twist angle;

second nematic liquid crystal interposed between said third substrate and said fourth substrate and having a desired retardation $\Delta n_2 \cdot d_2$, where $\Delta n_2$ is the refractive-index anisotropy of the second nematic liquid crystal and $d_2$ is the thickness of the layer of the liquid crystal, which retardation changes with temperature at a rate less than that of the retardation $\Delta n_1 \cdot d_1$ of said first nematic liquid crystal and which is less than the retardation $\Delta n_1 \cdot d_1$ of said first nematic liquid crystal, the molecules of said second nematic liquid crystal being twisted, from the third direction to the fourth direction by a second twist angle equal to said first twist angle in a second rotation direction, which is opposite to said first rotation direction;

first and second polarizing plates located outside said first substrate and said fourth substrate, respectively, the first polarizing plate having an optical axis crossing a direction in which the liquid crystal molecules are aligned on said substrate adjacent to the first polarizing plate, at an angle ranging from 35° to 50°, and the second polarizing plate having an optical axis crossing the optical axis of the first polarizing plate substantially at right angles; and drive means connected to the electrodes of the first set and the electrodes of the second set, for supplying multiplex drive signals to these electrodes, and for controlling transmittance of a plurality of pixels comprising portions of said first nematic liquid crystal which are sandwiched between the electrodes of the first set, and the electrodes of the second set.

15. A liquid crystal display device according to claim 14, wherein the retardation $\Delta n_2 \cdot d_2$ of said second nematic liquid crystal is less than the retardation $\Delta n_1 \cdot d_1$ of said first nematic liquid crystal for compensating for a decrease in the retardation $\Delta d_1 \cdot n_1$ of said first nematic liquid crystal which has resulted from the tilt angle defined by the voltage of the multiplex signal applied from said drive means to non-selected pixels.

16. A liquid crystal device according to claim 14, wherein said drive means comprises a drive circuit for supplying drive signals to the electrodes of the first set and the electrodes of the second set in accordance with data representing pattern data which is to be displayed, sensor means arranged near at least one of said first liquid crystal display unit and said second liquid crystal display unit, for detecting a temperate of at least one of said first liquid crystal display unit and said second liquid crystal display unit, and temperature compensating means for controlling the drive circuit in accordance with the temperature detecting by the sensor means, so that the drive signals output from said drive circuit have a predetermined optimum voltage.

17. A liquid crystal display device according to claim 16, wherein said temperature-compensating means means for controlling said drive circuit such that the first liquid crystal display unit has a maximum transmittance at any temperature.

18. A liquid crystal display device according to claim 14, wherein the retardation $\Delta n_2 \cdot d_2$ of said second nematic liquid crystal changes with temperature at a rate less than the retardation $\Delta n_1 \cdot d_1$ of said first nematic liquid crystal, and said drive means comprises a drive circuit for supplying drive signals to the electrodes of the first set and the electrodes of the second set in accordance with data representing pattern data which is to be displayed, sensor means for detecting the temperature of at least one of said first liquid crystal display unit and said second liquid crystal display unit, and temperature-compensating means for controlling the drive circuit in accordance with the temperature detected by the sensor means, to change the voltage of the drive signals.

* * * * *